(12) United States Patent
Danielsson et al.

(10) Patent No.: US 8,605,039 B2
(45) Date of Patent: Dec. 10, 2013

(54) TEXT INPUT

(75) Inventors: Mikael Danielsson, Höllviken (SE); Imre Zvorinji, Staffanstorp (SE); Sven Ekström, Lund (SE)

(73) Assignee: ZIMPL AB, Lund (SE)

( * ) Notice: Subject to any disclaimer, the term of this patent is extended or adjusted under 35 U.S.C. 154(b) by 353 days.

(21) Appl. No.: 12/399,509

(22) Filed: Mar. 6, 2009

(65) Prior Publication Data

US 2010/0225599 A1 Sep. 9, 2010

(51) Int. Cl.
G06F 3/041 (2006.01)
G06F 3/048 (2013.01)

(52) U.S. Cl.
USPC .......................................... 345/173; 715/816

(58) Field of Classification Search
USPC .......................................... 345/173
See application file for complete search history.

(56) References Cited

U.S. PATENT DOCUMENTS

| 5,818,437 | A | 10/1998 | Grover et al. |
| 6,011,554 | A | 1/2000 | King et al. |
| 6,204,848 | B1 | 3/2001 | Nowlan et al. |
| 6,307,549 | B1 | 10/2001 | King et al. |
| 6,636,162 | B1 | 10/2003 | Kushler et al. |
| 7,075,520 | B2 | 7/2006 | Williams |
| 7,177,797 | B1 | 2/2007 | Micher et al. |
| 7,319,957 | B2 | 1/2008 | Robinson et al. |
| 7,424,683 | B2 | 9/2008 | Van Leeuwen |
| 7,453,439 | B1 * | 11/2008 | Kushler et al. ............. 345/168 |
| 7,679,534 | B2 | 3/2010 | Kay et al. |
| 7,721,222 | B1 | 5/2010 | Shaik |
| 2004/0153963 | A1 | 8/2004 | Simpson et al. |
| 2005/0017954 | A1 | 1/2005 | Kay et al. |
| 2005/0052406 | A1 | 3/2005 | Stephanick et al. |
| 2005/0192802 | A1 | 9/2005 | Robinson et al. |
| 2005/0210402 | A1 | 9/2005 | Gunn et al. |
| 2005/0275632 | A1 | 12/2005 | Pu et al. |
| 2006/0161846 | A1 * | 7/2006 | Van Leeuwen ............... 715/702 |
| 2006/0236239 | A1 | 10/2006 | Simpson et al. |
| 2006/0265648 | A1 | 11/2006 | Rainisto et al. |
| 2006/0265668 | A1 | 11/2006 | Rainisto |
| 2007/0046641 | A1 * | 3/2007 | Lim ............................ 345/173 |
| 2007/0216659 | A1 | 9/2007 | Amineh |
| 2008/0030480 | A1 * | 2/2008 | Gunn et al. ................... 345/173 |
| 2009/0077464 | A1 | 3/2009 | Goldsmith et al. |

(Continued)

FOREIGN PATENT DOCUMENTS

| EP | 1634195 | 3/2006 |
| EP | 1356368 | 12/2007 |

(Continued)

OTHER PUBLICATIONS

International Search Report from corresponding PCT application No. PCT/EP2009/058124 mailed Dec. 22, 2009 (7 pages).

*Primary Examiner* — Joseph Feild
*Assistant Examiner* — Nicholas Lee
(74) *Attorney, Agent, or Firm* — Birch, Stewart, Kolasch & Birch, LLP

(57) ABSTRACT

An apparatus comprising a controller, wherein said controller is arranged to receive input referring to a key and identifying a touch point; display a first set of candidates comprising a plurality of candidates arranged around the touch point; receive input referring to a first candidate being comprised in said first set; receive a select command of said first candidate; and input said selected candidate as text.

36 Claims, 27 Drawing Sheets

(56) References Cited

U.S. PATENT DOCUMENTS

| | | |
|---|---|---|
| 2009/0265669 A1 | 10/2009 | Kida et al. |
| 2009/0306980 A1 | 12/2009 | Shin |
| 2010/0085312 A1 | 4/2010 | Kirkup |
| 2010/0088087 A1 | 4/2010 | Spjuth |
| 2010/0088616 A1 | 4/2010 | Park et al. |
| 2010/0199176 A1 | 8/2010 | Chronqvist |
| 2010/0225599 A1 | 9/2010 | Danielsson et al. |
| 2010/0292984 A1 | 11/2010 | Huang et al. |
| 2010/0293497 A1 | 11/2010 | Peterson |
| 2010/0313160 A1 | 12/2010 | Mossakowski |
| 2011/0037718 A1 | 2/2011 | Stephanick et al. |
| 2011/0099506 A1 | 4/2011 | Gargi et al. |

FOREIGN PATENT DOCUMENTS

| | | |
|---|---|---|
| EP | 1887451 | 2/2008 |
| EP | 1953623 | 8/2008 |
| WO | WO2009/034220 | 3/2009 |

* cited by examiner

TEXT INPUT

FIELD

The present application relates to a user interface, an apparatus and a method for improved text input, and in particular to a user interface, an apparatus and a method for improved text input based on providing candidates.

BACKGROUND

Many portable apparatuses such as mobile phones, Personal Digital Assistants (PDAs) and laptop computers are used for text input while becoming smaller and smaller.

Users have a need of inputting the text quickly and easily.

A device that allows fast and easy input of text would thus be useful in modern day society.

SUMMARY

On this background, it would be advantageous to provide a user interface, an apparatus and a method that offers a fast and easy input of text by providing an apparatus according to the claims.

According to one aspect of the teachings herein an apparatus is provided comprising input means for receiving input referring to a key and identifying a touch point; display means for displaying a first set of candidates comprising at least one candidate arranged around the touch point; input means for receiving input referring to a first candidate being comprised in said first set; input means for receiving a select command of said first candidate; and control means for inputting said selected candidate as text.

According to an embodiment of this aspect the apparatus further comprises means for displaying a further set of candidates upon receipt of input referring to said first candidate, wherein said further set of candidates comprises at least one further candidate According to an embodiment of this aspect and the embodiment above the apparatus further comprises input means for receiving input referring to a further candidate being comprised in said further set of candidates and control means for identifying said further candidate as a first candidate.

According to an embodiment of this aspect and the embodiments above the apparatus further comprises control means for displaying a second set comprising a further set of candidates.

According to an embodiment of this aspect the apparatus further comprises means for displaying a second set of candidates upon receipt of input referring to said first candidate, wherein said second set of candidates comprises at least one second candidate being an alternative to the at least one candidate of said first set and said second set of candidates being regarded as a first set of candidates.

According to an embodiment of this aspect the apparatus further comprises display means for displaying said touch point.

According to an embodiment of this aspect wherein said input is a touch input identifying a virtual key and wherein said touch point is the point of touch for the touch input.

According to an embodiment of this aspect and the embodiments above the apparatus further comprises means for displaying said candidates at a position offset from said touch point and for interpreting any touch input as having an offset position wherein the offsets are equal.

According to an embodiment of this aspect above the apparatus further comprises display means for displaying said candidates as virtual keys.

According to an embodiment of this aspect the apparatus further comprises input means for receiving a touch input release and control means for interpreting said release as a select command.

According to an embodiment of this aspect the apparatus further comprises control means for displaying a set of candidates based on previous input.

According to an embodiment of this aspect the apparatus wherein said candidate is associated with a word completion.

According to an embodiment of this aspect the apparatus, wherein said candidate is associated with a prediction.

According to an embodiment of this aspect the apparatus further comprises, wherein at least one of said candidates is static with regards to at least one of placement and associated letter.

According to an embodiment of this aspect the apparatus further comprises, wherein each candidate is associated with a direction and wherein said apparatus further comprises means for receiving a direction indication and for identifying a candidate accordingly as a first candidate.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the user interface, the apparatus, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
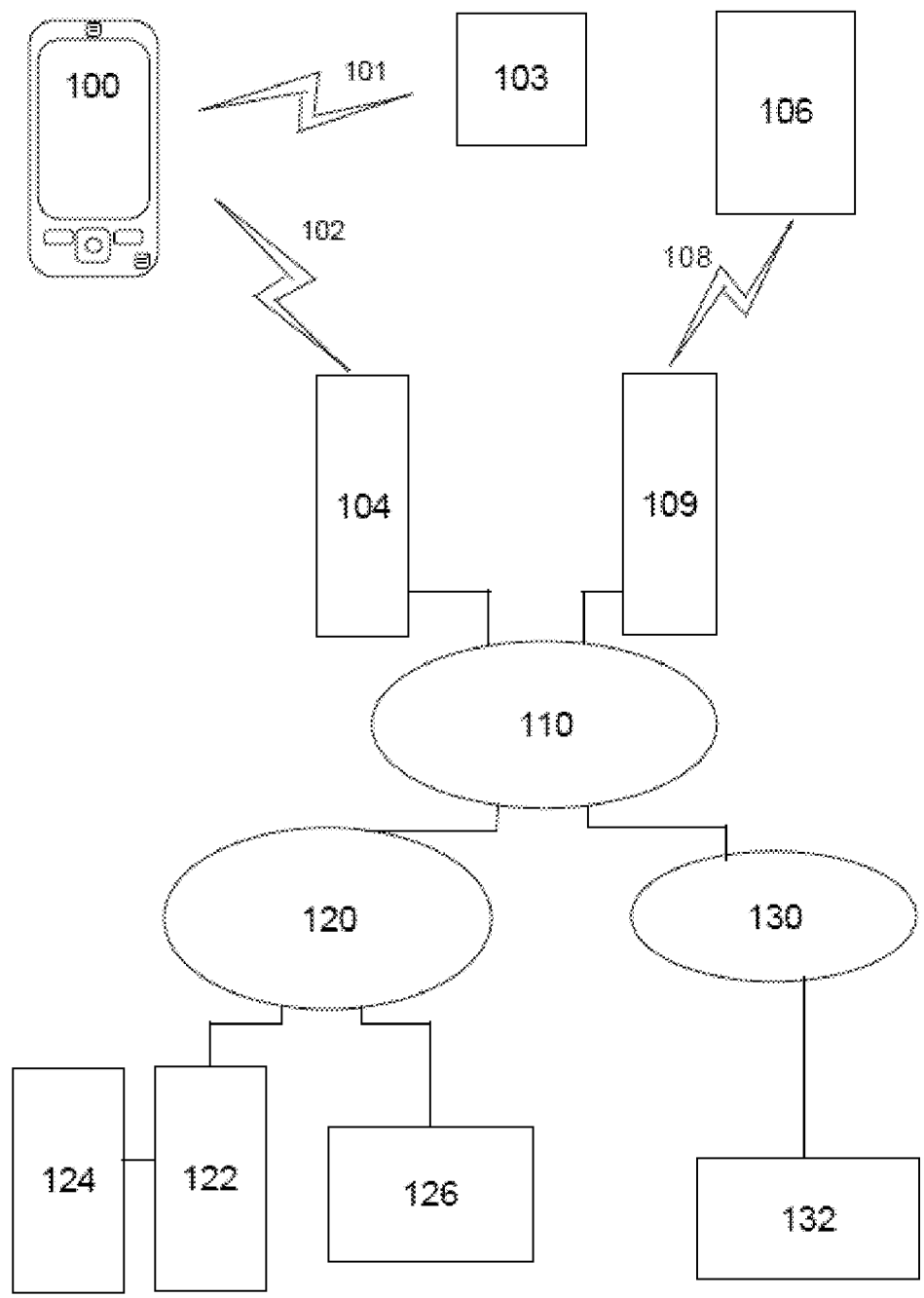
FIG. 1 is an overview of a telecommunications system in which a device according to the present application is used according to an embodiment, FIGS. 2a and b are views of each an apparatus according to an embodiment.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency (RF) links 102, 108 via base stations 104, 109. The mobile telecommunications network 110 may be in compliance with any commercially available mobile telecommunications standard, such as Group Speciale Mobile (GSM), Universal Mobile Telecommunications System (UMTS), Digital Advanced Mobile Phone system (D-AMPS), The code division multiple access standards (CDMA and CDMA2000), Freedom Of Mobile Access (FOMA), and Time Division-Synchronous Code Division Multiple Access (TD-SCDMA).

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 as is commonly known by a skilled person. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

A computer such as a laptop or desktop can also be connected to the network both via a radio link such as a WiFi link, which is the popular term for a radio frequency connection using the WLAN (Wireless Local Area Network) standard IEEE 802.11.

It should be noted that the teachings of this application are also capable of being utilized in an internet network of which the telecommunications network described above may be a part of.

It should be noted that even though the teachings herein are described solely to wireless networks it is in no respect to be limited to wireless networks as such, but it to be understood to be usable in the Internet or similar networks.

It should thus be understood that an apparatus according to the teachings herein may be a mobile communications terminal, such as a mobile telephone, a personal digital assistant, a laptop as well as a stationary device such as a desktop computer or a server.

The apparatus can also be a digital camera having communicative means. Such communicative means can be a serial connection through which it is capable of communicating with another device such as a computer.

Figures 2A, 2B:
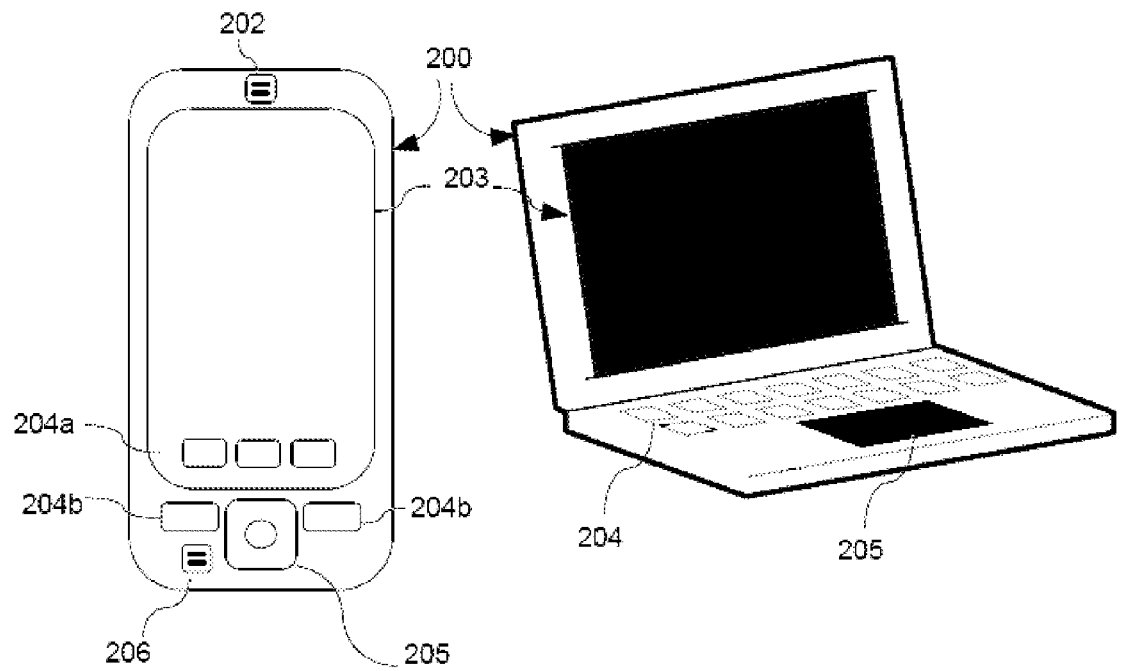

An embodiment 200 of the mobile terminal 100 is illustrated in more detail in FIG. 2a. The mobile terminal 200 comprises a speaker or earphone 202, a microphone 206, a main or first display 203 which in one embodiment is a touch display and a set of keys 204 which may include a keypad 204a of common ITU-T type (alpha-numerical keypad representing characters "0"-"9", "*" and "#") and certain other keys such as soft keys 204b, 204c and a joystick 205 or other type of navigational input device.

An alternative embodiment of the teachings herein is illustrated in FIG. 2b in the form of a computer which in this example is a laptop computer 200. The laptop computer has a display 203, a keypad 204 and navigational means in the form of a cursor controlling input means which in this example is a touchpad 205.

It should be noted that a computer can also be connected to a wireless network as shown in FIG. 1 where the computer 200 would be an embodiment of the device 100.

Figure 3:
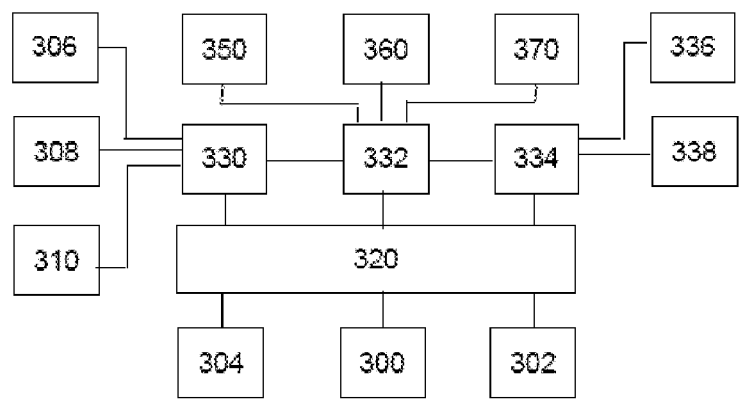
FIG. 3 is a block diagram illustrating the general architecture of an apparatus of FIG. 2a in accordance with the present application.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM), Read Only Memory (ROM), Electrically Erasable Programmable Read-Only Memory (EEPROM), flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a message text editor 350, a notepad application 360, as well as various other applications 370, such as applications for voice calling, video calling, sending and receiving messages such as Short Message Service (SMS), Multimedia Message Service (MMS) or email, web browsing, an instant messaging application, a phone book application, a calendar application, a control panel application, a camera application, one or more video games, etc. It should be noted that two or more of the applications listed above may be executed as the same application.

The MMI 334 also includes one or more hardware controllers, which together with the MMI drivers cooperate with the display 336/203, and the keypad 338/204 as well as various other Input/Output devices such as a navigational input device such as a touchpad 205, a microphone, a speaker, a vibrator, a ringtone generator, an LED (Light Emitting Diode) indicator, etc.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

The mobile terminal also has a Subscriber Identity Module (SIM) card 304 and an associated reader. As is commonly known, the SIM card 304 comprises a processor as well as local work and data memory.

FIG. 4 shows a screen shot view of an apparatus 400 according to the teachings herein. It should be noted that such an apparatus is not limited to a mobile phone, but can be any apparatus capable of receiving text input.

The apparatus 400 has a display 403 on which a virtual keyboard is displayed. The virtual keyboard comprises a number of virtual keys that are associated with a letter.

A controller is configured to receive touch input referring to a letter key. To input a letter on an apparatus 400 a user simply taps on the virtual key associated with the letter and the controller will input the associated letter.

A tap is in this context defined to be a series of touching on the touch display over a graphical object such as a virtual key and releasing the touch within a short time period. A short time period is in this aspect considered to be a time period shorter than 0.3 seconds. Other alternatives for the time period are known in the prior art.

In one embodiment the touched virtual key is marked. In one embodiment the marking is effected by inverting the colors. In another embodiment the marking is effected by displaying the touched virtual key in a different color than the other virtual keys.

The controller is further configured to display a set of candidate wordstems. A wordstem may be a suffix, a prefix, a commonly used letter combination, word or a partial word.

In one embodiment the candidates are arranged around a touch point. In this example embodiment the candidates are displayed around the virtual key being touched.

The set of candidates are displayed around the touched virtual key as a series of virtual keys each associated with a wordstem.

In one embodiment the candidates are distributed evenly around the touched key.

In one embodiment the number of candidates displayed is eight. In such an embodiment the candidates are displayed in order around the touched virtual key as top-left, top, top-right, left, right, bottom-left, bottom, bottom-right. This provides a user with an easy to overview listing of the candidates where all candidates are at essentially the same distance from the originally touched virtual key. This enables a user to easily access all candidates.

In one embodiment the candidates are arranged in an order of frequency of use so that the candidate that is most frequently used is displayed in a most easily accessible position. This ensures that an input stroke sequence will be as smooth as possible for the most often input candidates.

In one embodiment the candidates are arranged in alphabetical order. In one embodiment the order is clockwise. In one embodiment the order is counter-clockwise.

The number of candidates displayed depends on design issues such as display size, keypad size, virtual key size, and also upon the width of the stylus used and the number of available candidates.

A controller is configured to receive input identifying a candidate.

In one embodiment the identified candidate is marked.

To select a candidate the user thus simply drags the stylus over to the candidate.

A controller is further configured to receive a selection command selecting a candidate for input.

In one embodiment the selection command is a release of the stylus from the touch display 403.

To select a candidate a user thus only has to slide over to the candidate and release.

Figure 4A:
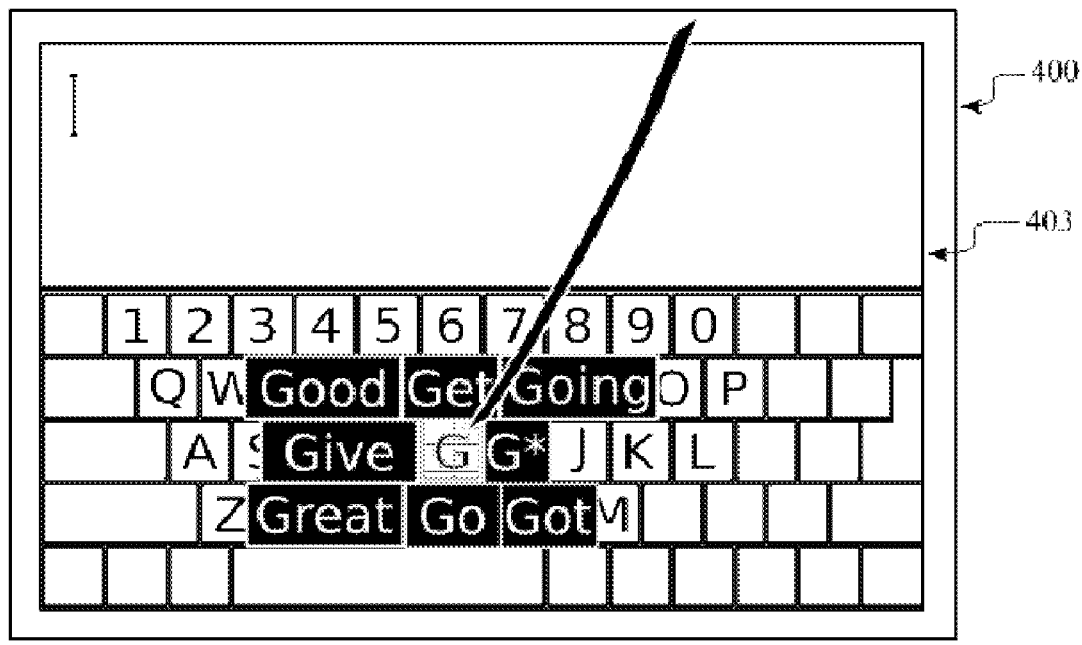
FIGS. 4, 5, 6, 7, 8, 9, 10, 11, 12, 13, 14, 15 and 16 are series of screen shot views of an apparatus according to an embodiment.
Figure 4B:
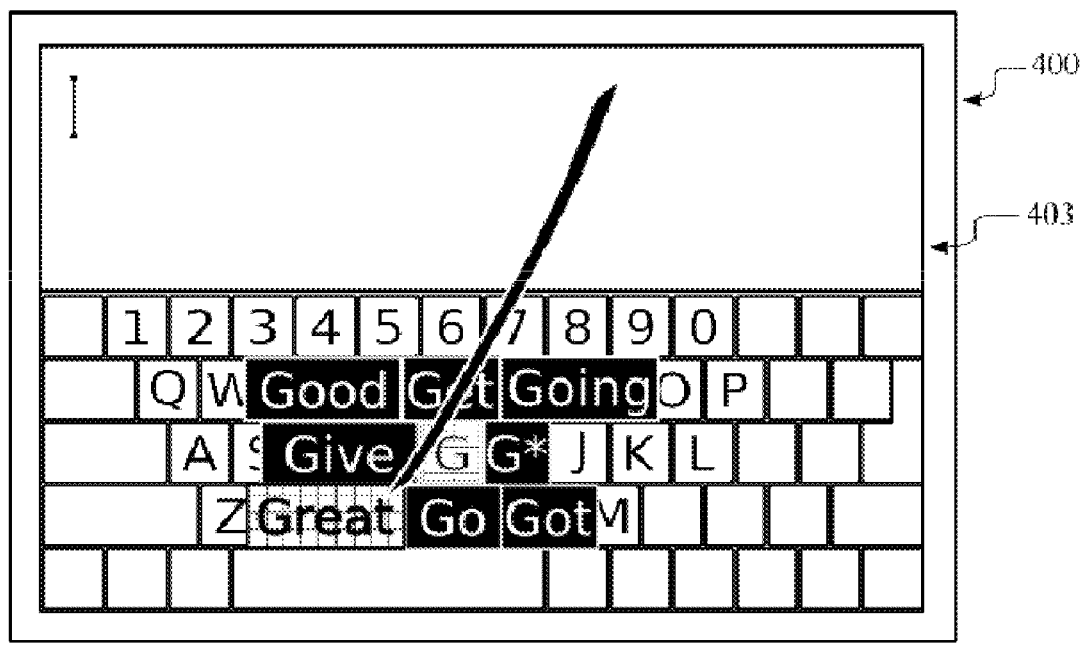
Figure 4C:
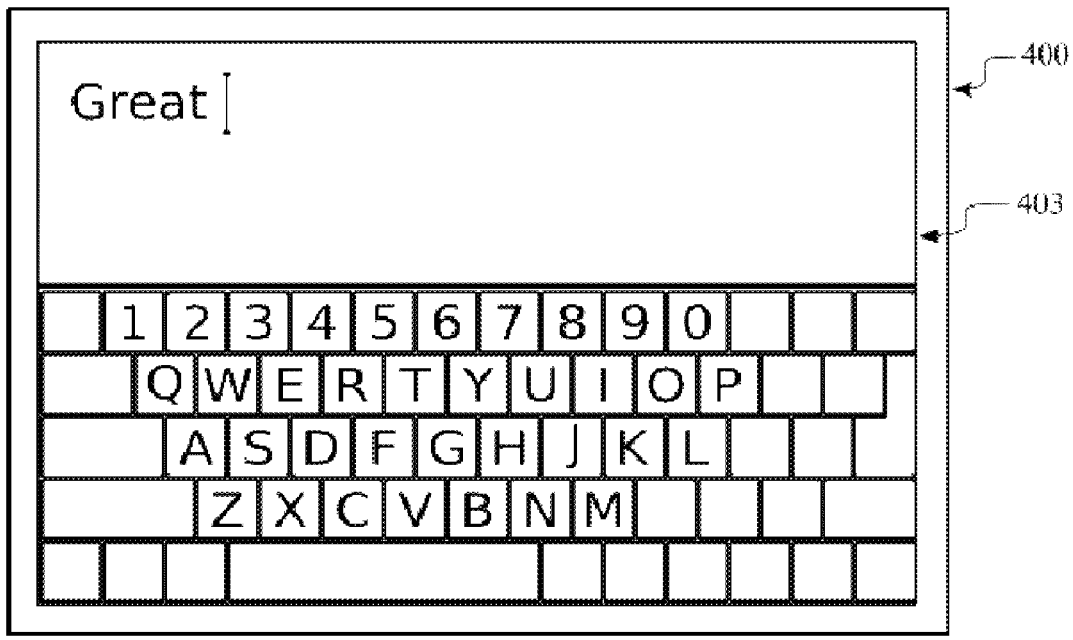

In the example shown in FIG. 4 a user touches on a virtual key being associated with the letter 'g'. In response thereto the controller displays a set of candidates. The candidates are "good", "get", "going", "give", "g*", "great", "go" and "got"), see FIG. 4*a*. The user then slides the stylus over to a candidate "great" which is marked, see FIG. 4*b*. As the user releases the stylus from the display 403 the candidate is input as a text string, see FIG. 4*c*.

In one embodiment the selection command is a further tap. In one embodiment the candidates are displayed until a selection command or another virtual key associated with a letter has been touched.

In one embodiment such as above the user would not have to slide the stylus or finger over to a candidate. Tapping on a letter would display the candidates and a further tap on a candidate would select that candidate for input. In one embodiment a double tap on a virtual key associated with a letter would input the letter. One tap for identifying the virtual key and one for selecting the associated letter for input.

It should be noted that the alternatives for selection and marking are possible to implement for all embodiments described herein.

In one embodiment the controller is configured to determine if a touch input referring to a letter is touching the touch display 403 for a longer time period and in response thereto display the set of candidate wordstems.

In one embodiment the controller is configured to display the candidates in order of frequency of use in a used language.

In one embodiment the controller is configured to display the candidates in order of frequency of use by the user.

In one embodiment the controller is configured to display the candidates in a clockwise arrangement with the most frequent candidate in the upper position and the second most used candidate to the right of the first candidate etc.

In one embodiment the controller is configured to display the candidates in a counter-clockwise arrangement with the most frequent candidate in the upper position and the second most used candidate to the left of the first candidate etc.

In one embodiment the controller is configured to display the candidates in an alternating opposite arrangement for example with the most frequent candidate in the upper position and the second most used candidate in the lowest position, the third most used candidate to the left and the fourth most used candidate to the right.

In one embodiment the controller is configured to receive instructions from a user or reading settings and display the candidates in an arrangement accordingly. In such an embodiment a user may arrange the candidates to his liking. In such an embodiment it is also possible for a service provider to push arrangement settings to an apparatus.

In one embodiment the controller is configured to maintain a static arrangement for each candidate set. In such an embodiment the order of the candidates and their positions does not change over time (or only upon user instruction). This enables a user to more easily learn where a candidate is positioned and associate that candidate with a specific gesture. This enables a user to quickly and efficiently input candidates as more and more gestures are learnt by the user.

In the example described above a user is able to input the word "great" by making one single and simple gesture.

FIG. 5 shows a screen shot view of an apparatus 500 according to the teachings herein. It should be noted that such an apparatus is not limited to a mobile phone, but can be any apparatus capable of receiving text input.

The apparatus 500 has a display 503 on which a virtual keyboard is displayed. The virtual keyboard comprises a number of virtual keys that are associated with a letter.

Figure 5A:
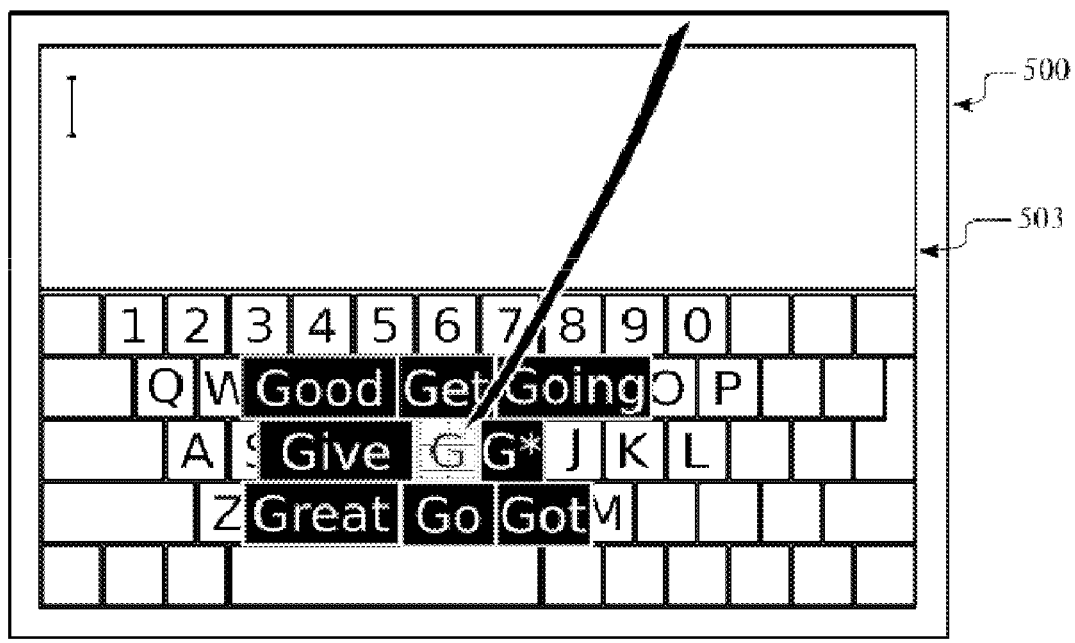

In FIG. 5a a user has touched on the virtual key being associated with the letter 'g' and a set of candidates have been displayed. A controller is configured to receive a touch input and in response thereto display a further set of candidates comprising candidates that relate to the candidate touched.

In one embodiment the candidates are arranged around a touch point. In this example embodiment the candidates are displayed around the candidate being touched.

Figure 5B:
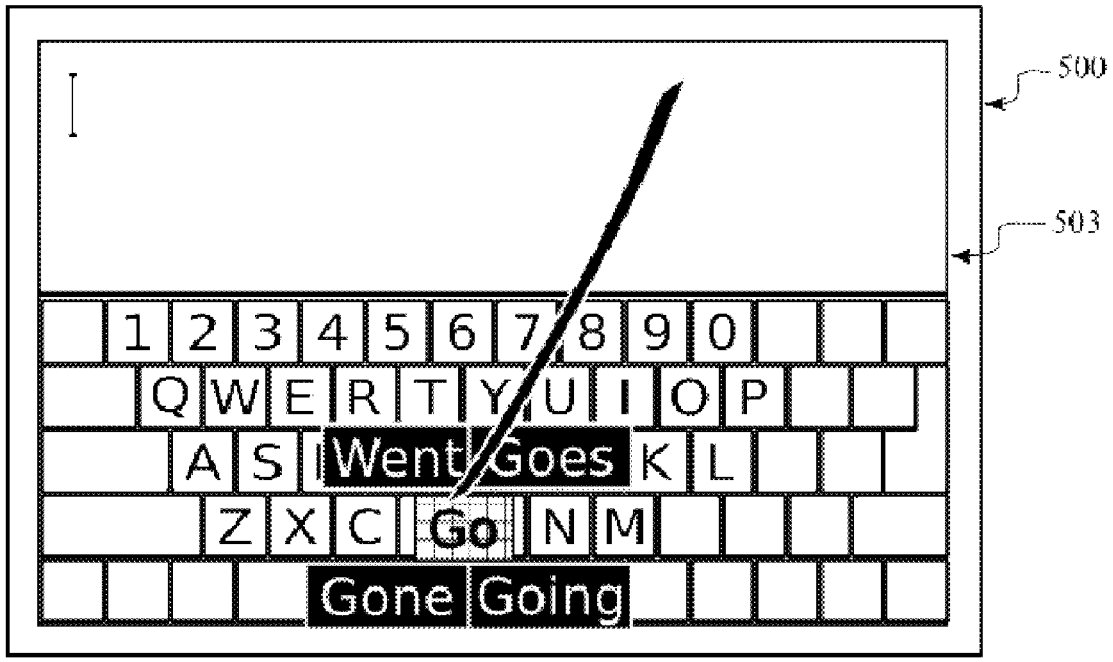

FIG. 5b shows a display where a set of 4 candidates have been displayed on a further set for the touched candidate referring to "go".

The number of candidates that are displayed depend on design issues such as display size, keypad size, font size as well as the stylus width and the available number of candidates.

In one embodiment the further candidates are displayed simultaneously with the first set of candidates. This provides further options to be seen and available for selection.

In one embodiment the further set overlaps the first set.

In one embodiment the first set is no longer displayed as the further set is displayed.

In one embodiment the candidate touched is displayed when the further set is displayed. The touched candidate is available for selection in such an embodiment.

In one embodiment the candidates of the further set are related to inflection, declination or conjugation of the candidate for which they are displayed. In one embodiment they are extensions of the candidate for which they are displayed. In one embodiment they are completions of words starting with the candidate for which they are displayed. And in one embodiment they are a combination of these alternatives.

In FIG. 5b the candidate being touched is "go" and the candidates displayed are "went", "goes", "gone" and "going". As can be seen for "went" which actually has changed what has already been marked for input, namely "go". The word "went" is related to "go" so it would be intuitive for a user to choose "go" to arrive at "went" even though the spelling does not match.

Thus the candidates and the further candidates offer a user a set of available candidates that are easy to arrive at and intuitive to find.

For users writing in a foreign language this also provides support as they are presented with the different forms of words without having to know exactly how they are spelt.

Figure 5C:
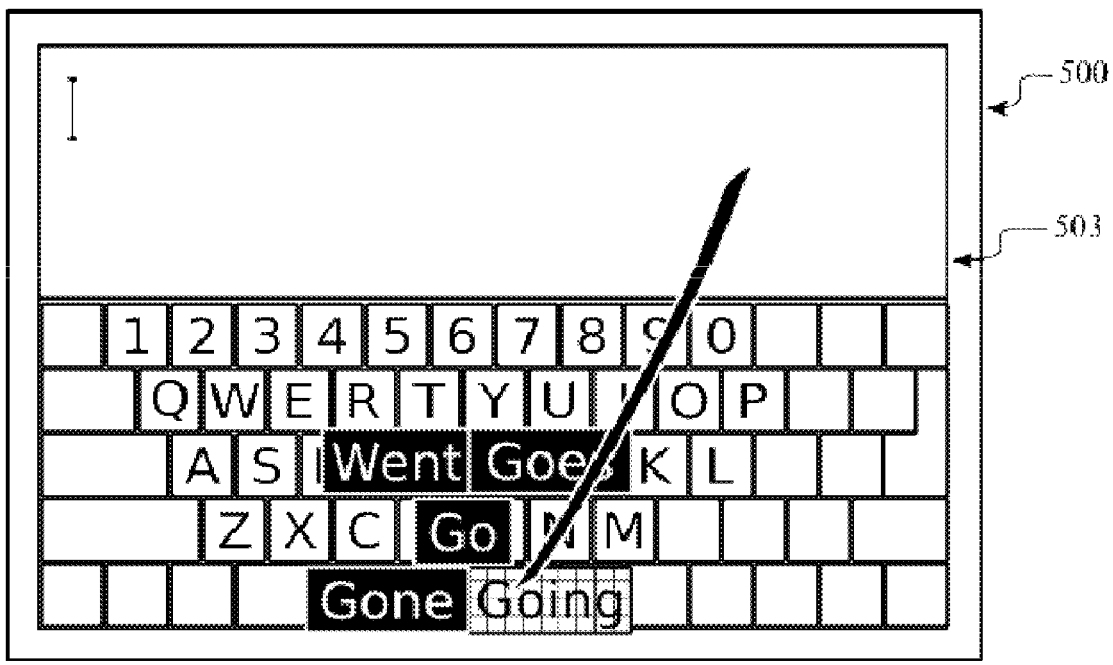
Figure 5D:
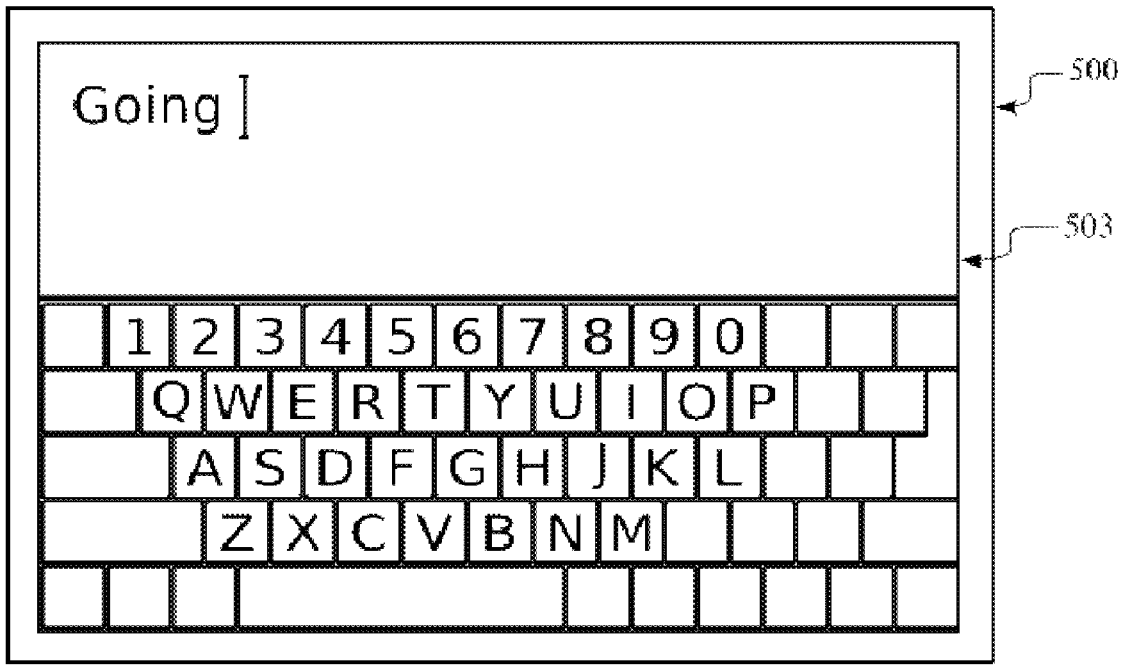

In FIG. 5c the user has slid the stylus to the candidate being associated with "going". In this embodiment the candidate touched is thus marked. In this embodiment the marking is effected through the use of different colors form the other candidates' graphical representations. A controller is configured to receive a select command of a touched candidate and in response thereto input the wordstem associated with the candidate. FIG. 5d shows a display where a user has released the touched candidate from FIG. 5c and the word "going" has been input and is displayed in the text input area.

As can be see in FIG. 5b and FIG. 5c the virtual key is still marked as being blacked out to indicate to a user which letter is being processed. In one embodiment the virtual key is no longer marked as a set of candidates is displayed.

In the example described above a user is able to input the word "going" by making one single and simple gesture.

FIG. 6 shows an apparatus 600 according to the teachings herein. It should be noted that such an apparatus is not limited to a mobile phone, but can be any apparatus capable of receiving text input.

The apparatus 600 has a display 603 on which a virtual keyboard is displayed. The virtual keyboard comprises a number of virtual keys that are associated with a letter.

In one embodiment a controller is configured to display a set of candidates as a virtual key associated with a letter is touched in the same manner as has been described with reference to FIG. 4.

In one embodiment a candidate is associated with a second set of candidates and indicates to a user that more candidates are available. Such a candidate is in one embodiment indicated by a star following the associated letter, such as "g*" for the candidate set associated with the virtual key associated with the letter "g". In alternative embodiments other markings are used such as "g . . . ", " . . . ", "MORE", "more", etc. In one embodiment a color is used to indicate that a candidate is marked. In such an embodiment the marked candidate is displayed using a different color set than the other candidates are displayed with.

In one embodiment the candidates are arranged around a touch point.

In one embodiment the second set of candidates is displayed around the virtual key associated with the letter, the virtual key being the touch point. In one such embodiment the virtual key associated with the candidate indicating that more candidates are available can be re-associated with the first set of candidates and a repeated touch input on that candidate will cause the controller to switch back to displaying the first set.

In one embodiment the second set is displayed around the candidate indicating that a second set is available, the candidate being the touch point. This provides for more fluent sliding gestures. And also allows for more candidates to be displayed. Additionally the first set may also be displayed, possibly partially, at the same time.

In one embodiment the second set of candidates may comprise a candidate indicating that yet a second set of candidates is available. In one embodiment the second set of candidates comprise a candidate which is associated with the first set of candidates.

Figure 6A:
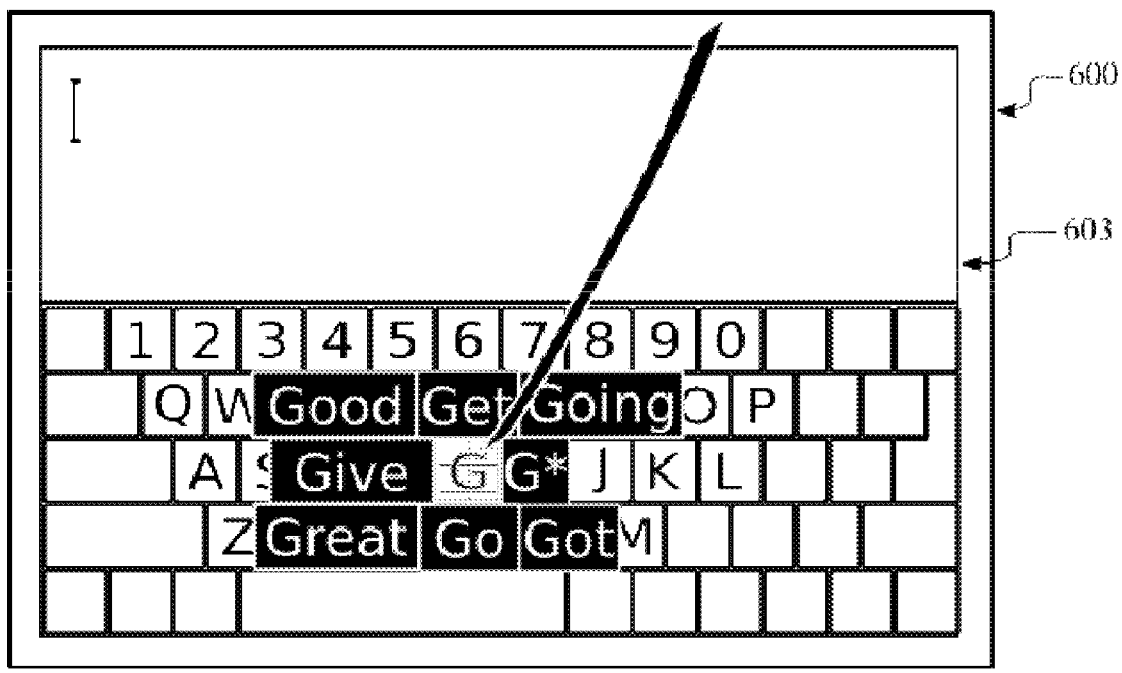
Figure 6B:
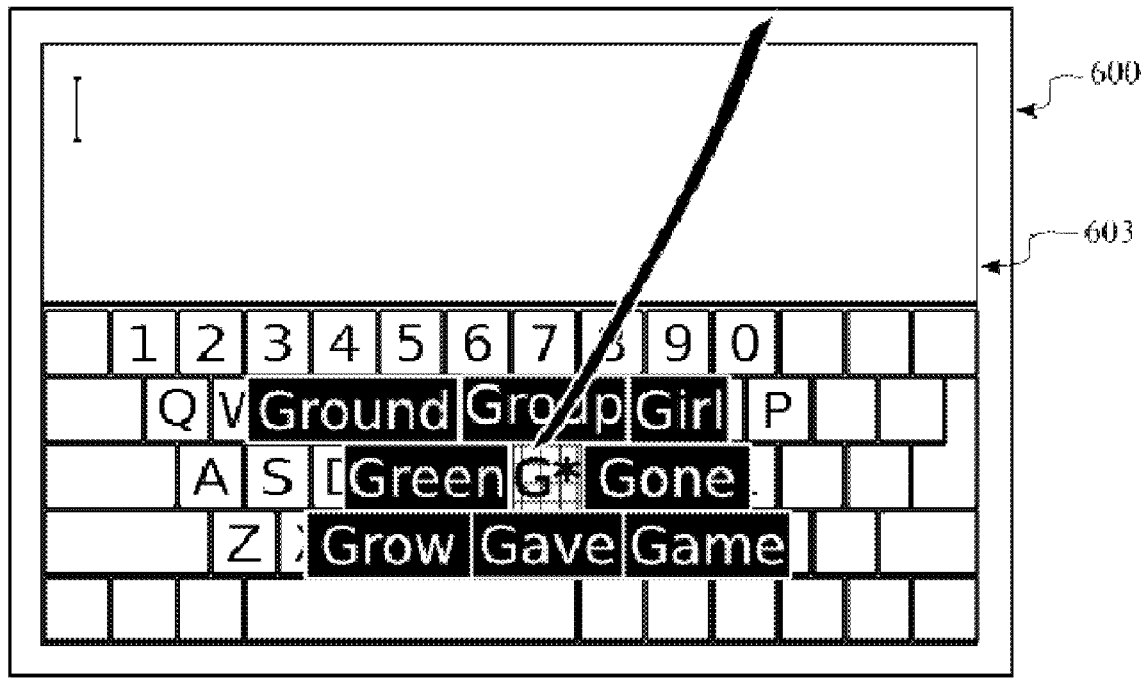

In FIG. 6a a user has touched on a virtual key associated with the letter "g" and a set of candidates have been displayed as in FIG. 4a. A controller is configured to receive input identifying a candidate being associated with a second set of candidates. In one embodiment the input is a sliding gesture from the touched virtual key being associated with the letter "g" to the virtual key associated with the candidate being associated with the second set, in other words the virtual key marked "g*". FIG. 6b shows the display 603 after a user has dragged the stylus from the "g" to the "g*" and a second set of candidates are displayed around the candidate.

In one embodiment the second set of candidates is displayed instead of the first set of candidates, see FIG. 6b. The second set of candidates comprise the candidates "ground", "group", "girl", "green", "gone", "grow", "gave" and "game".

In one embodiment prefixes are indicated with an ending hyphen, for example "pre-".

In one embodiment suffixes are indicated with a starting hyphen, for example "-fix".

In one embodiment the candidates represent names.

In one embodiment a candidate is displayed as an image representing the candidate. In one such embodiment an apple can be displayed to represent the candidate "apple". In another such embodiment an image is displayed to represent a candidate which is associated with a name. In one such embodiment a controller is arranged to search through a database, in one embodiment a contact database, for matching a candidate to an image. For example one candidate is associated with "John" and there is an entry in the phonebook for "John Smith" which entry is associated with a picture of John Smith. As the candidate is displayed it is represented by the picture of John Smith. In an alternative embodiment the controller is configured to display the associated picture adjacent the candidate. In one such embodiment selection of the picture will cause the controller to input the full name associated with the picture.

Figure 6C:
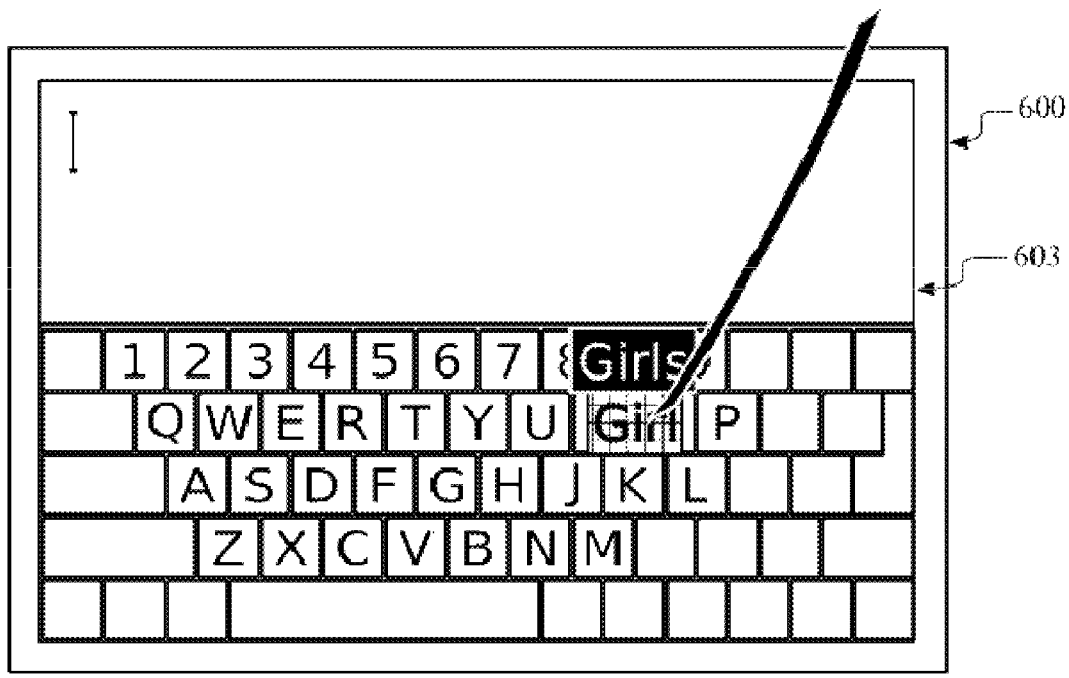
Figure 6D:
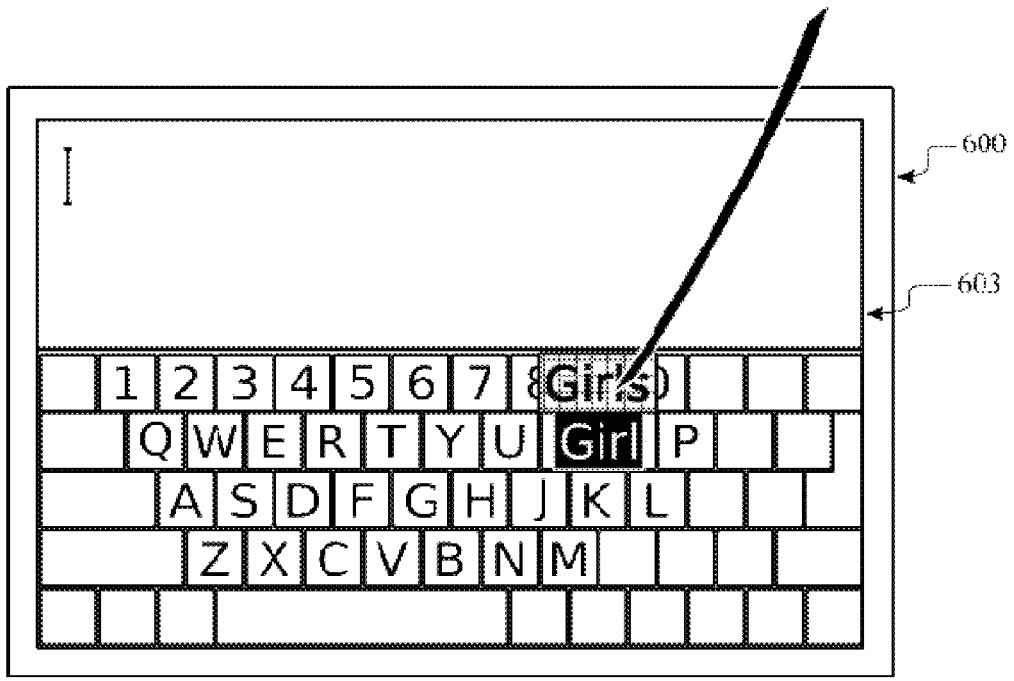

FIG. 6d shows a combination of the embodiments of FIGS. 6a to 6c and those of FIG. 5. A controller is configured to receive touch input referring to a second candidate and in response thereto display a set of further candidates. The controller is further arranged to receive input referring to a further candidate and also to receive a selection command of the further candidate.

In FIG. 6d a user has slid the stylus to the candidate associated with the wordstem "girl" and in response thereto the controller has displayed a set of further candidates, which are all forms of the word "girl", namely "girls". Other possible candidates are (not shown) "girly" and "girlish".

As is described with reference to FIG. 5 the candidates of the further set are related to an inflection, declination or conjugation of the candidate for which they are displayed. In one embodiment they are extensions of the candidate for which they are displayed. In one embodiment they are completions of words starting with the candidate for which they are displayed. And in one embodiment they are a combination of these alternatives.

A controller is configured to receive a select command of one of the second candidates. In one embodiment the selection command is a release of the stylus from the touch display 603.

Figure 6E:
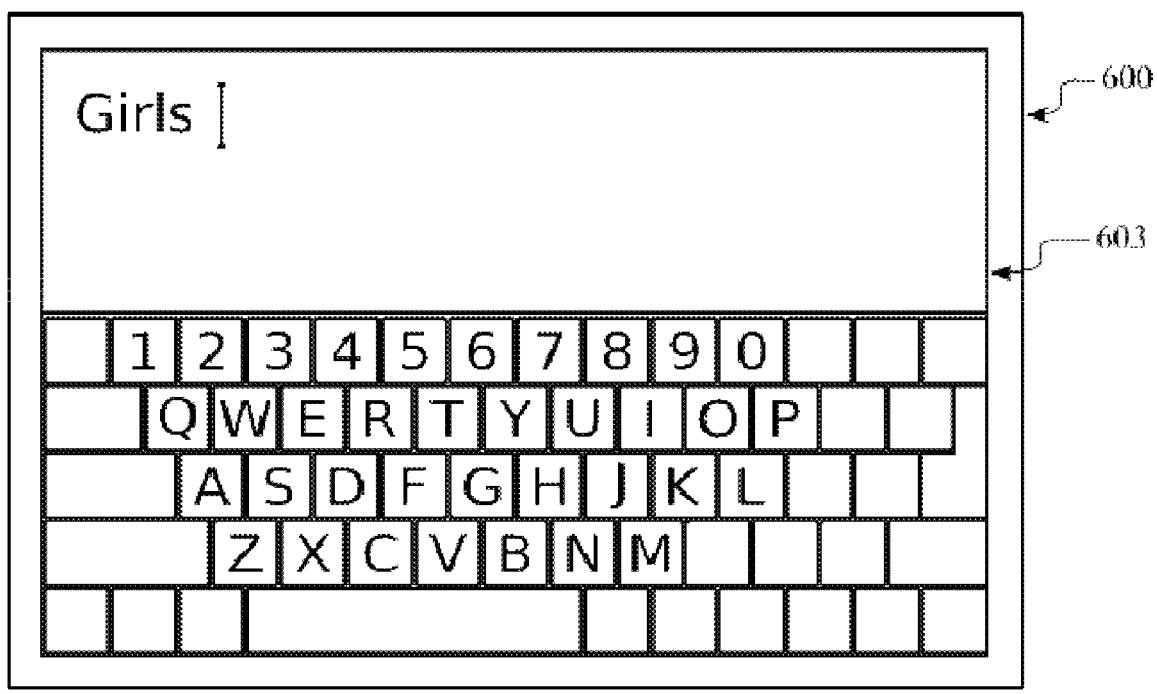

FIG. 6e shows the display 603 after a user has slid the stylus out to a candidate of the second set and selected it for input. In this example the candidate associated with "girls" is selected.

In the example described above a user is able to input the word "girls" by making one single and simple gesture.

In one embodiment the candidates of the further set of candidates are distributed evenly around the touched candidate. In one embodiment they are distributed adjacent one or more sides of the touched candidate. This enables the first set of candidates to be visible while the further set of candidates are being displayed which allows a user the possibility of inputting one of the first set candidates.

In one embodiment the controller is configured to add a space character to the text as a candidate is selected for input. For example, when the word "done" is selected the resulting string will be "done ".

In one embodiment the controller is configured to not add a space character to the text as a candidate being associated with a prefix is selected for input. For example, when the prefix "en-" is selected the resulting string will be "en".

In one embodiment the controller is configured to delete a previous space character from the text as a candidate being associated with a suffix is selected for input. For example, when the word "enter" has already been input resulting in the string "enter " and the suffix "-ed" is selected for input the resulting string will be "entered".

In one embodiment a controller is configured to receive touch input representing a circular or helical motion over the displayed candidates. The controller is then configured to display a second set of candidates.

Figure 7A:
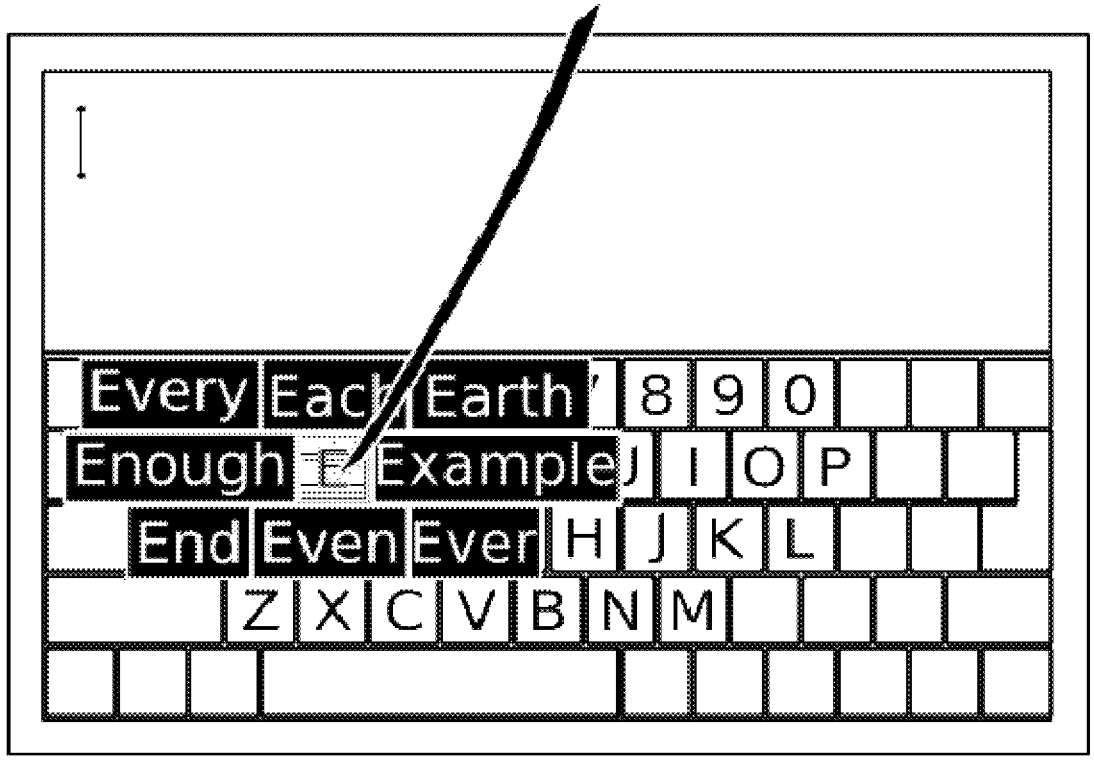
Figure 7B:
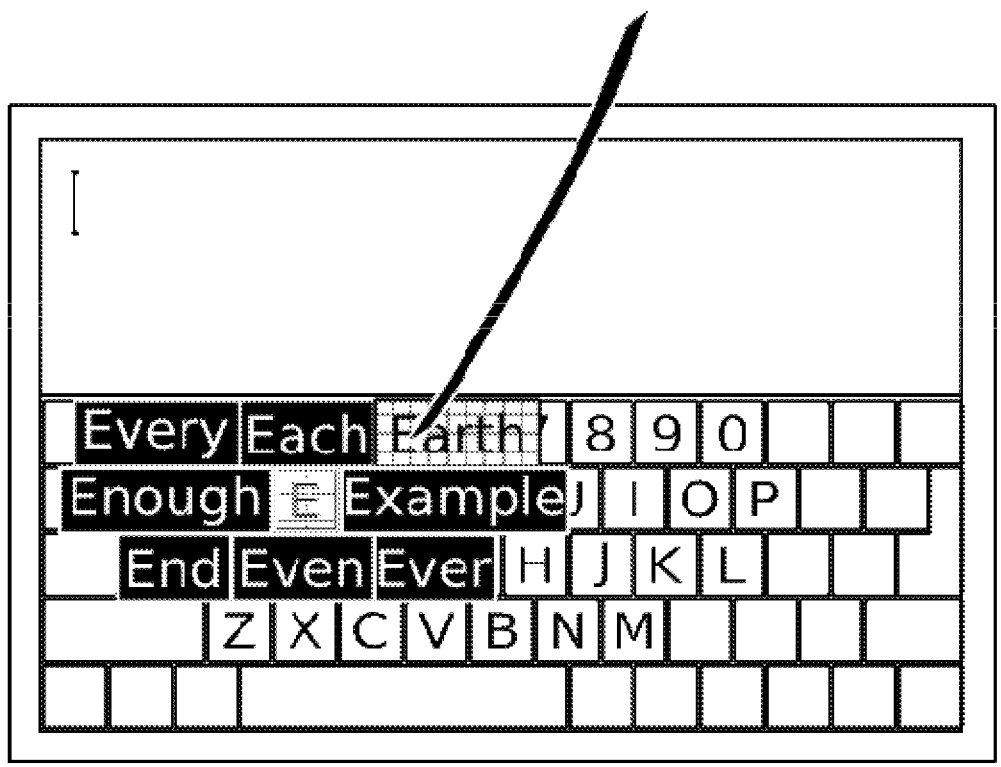
Figure 7C:
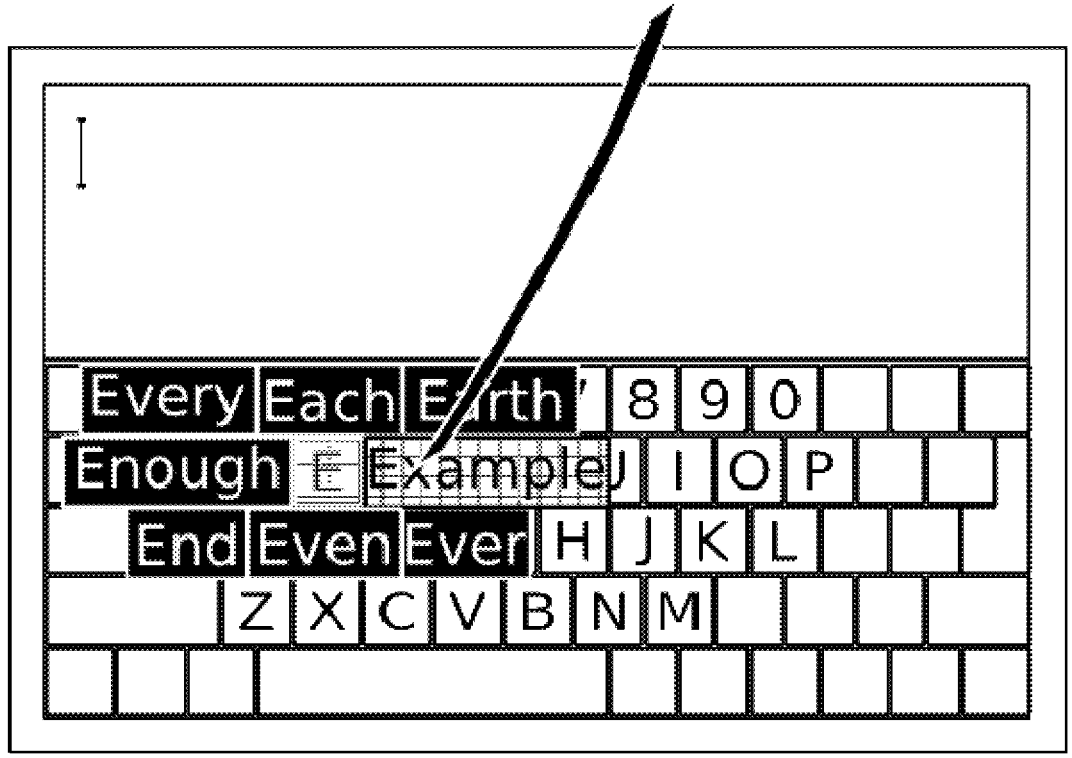
Figure 7D:
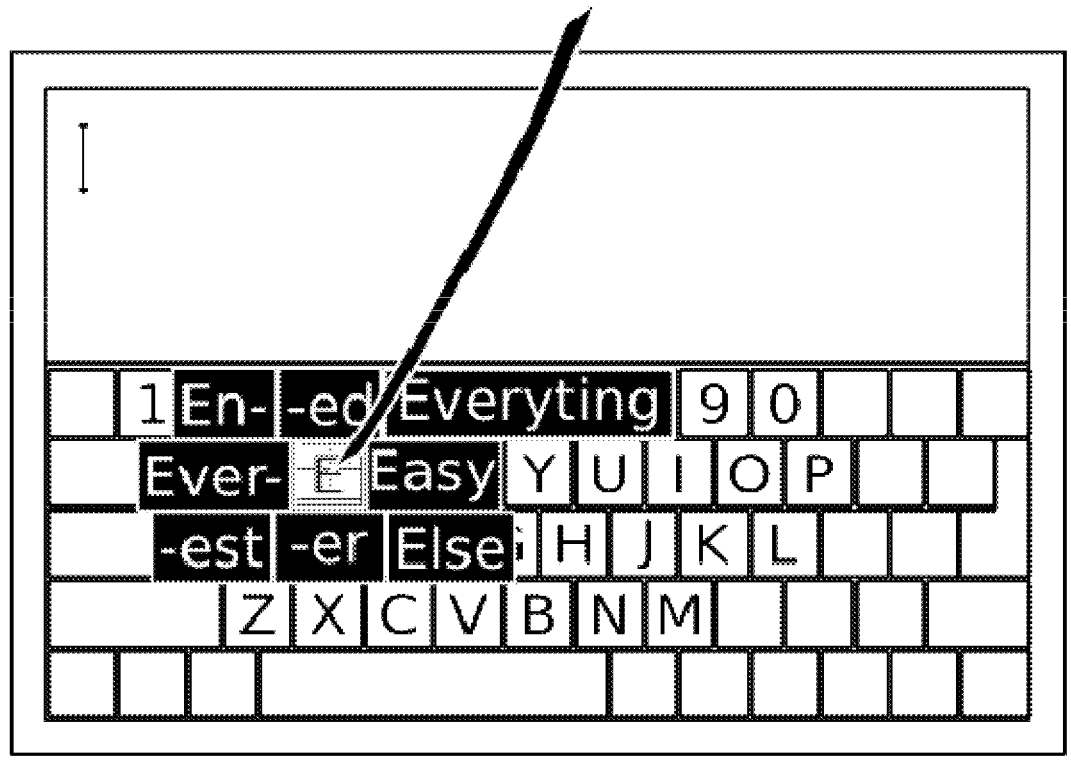

FIG. 7a shows an apparatus where a user has touched on a virtual key being associated with the letter 'e' and the controller has displayed a set of candidates in response to the received touch input. The candidates are "every", "each", "earth", "enough", "example", "end", "even" and "ever". In FIG. 7b the user is touching on the candidate being associated with the word "earth". As a user proceeds with a rotational motion and touches on the candidate being associated with the word "example", see FIG. 7c, and back again the controller detects this and displays a second set in response thereto as is shown in FIG. 7d. The second set of words and wordstems are "en-", "-ed", "everything", "ever-", "example", easy", "-est", "-er", and "else".

In one embodiment the candidates are arranged around a touch point. In this example embodiment the candidates are displayed around the virtual key being touched, the virtual key being the touch point.

In one embodiment the candidate indicating a second set (marked "g*" in FIG. 6) is displayed. In this exemplary embodiment it is not.

In one embodiment a circular or rotational motion clockwise indicates to a controller to switch to a next candidate set.

In one embodiment a circular or rotational motion counter-clockwise indicates to a controller to switch to a previous candidate set.

In one embodiment the candidate sets are part of a logical linked loop so that continuous rotational movements will result in displaying the available candidate sets for the virtual key in order and then returning to the first candidate set.

It should be noted that which order to switch candidate sets are mapped to the rotational directions chosen are dependent on language and cultural preferences and is a design issue.

In one embodiment the controller is configured to display a set of candidates where the candidates are completions of the word being input taking into account the previous letters input. In one embodiment the letters taken into account are the latest input letters following a space character. In one embodiment the letters taking into account are the latest input letters following a hyphen character.

In one embodiment the controller is configured to display candidates relating to both word completions and to wordstems.

Figure 8A:
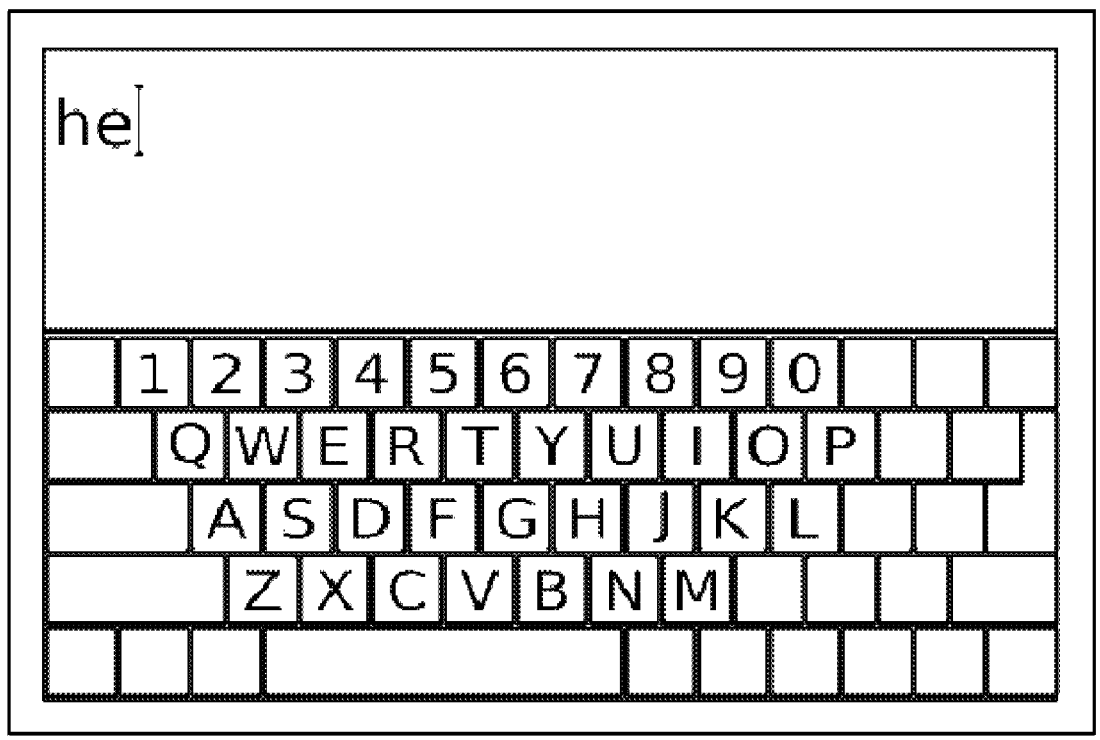
Figure 8B:
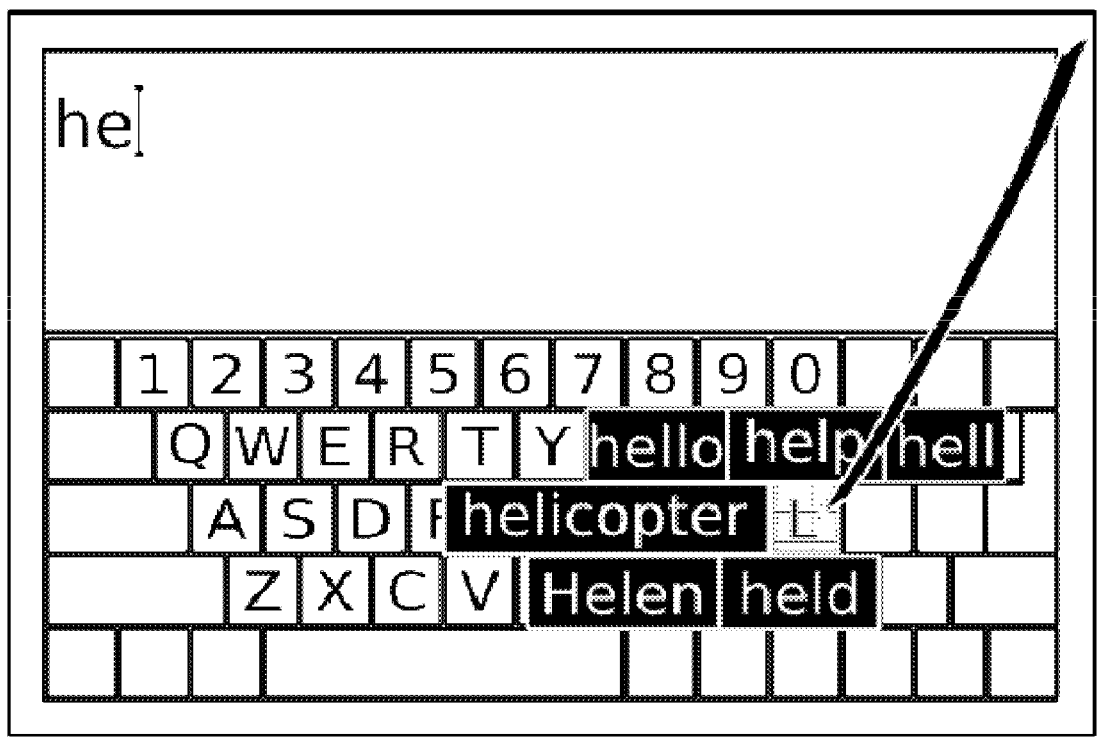

FIG. 8 shows an example where a user has already input the two letters 'h' and 'e', see FIG. 8a. As the user touches on 'l' the candidates "hello", "hell", "held", "help", "Helen" and "helicopter", see FIG. 8b.

As the user touches on a candidate the controller is configured to input the candidate as described for the above embodiments.

In one embodiment a candidate set comprise a candidate which is associated with a set of candidates all being word completions. In one embodiment such a candidate is marked with " . . . ". In the example above the words "hello", "hell", "held", "help", "Helen" and "helicopter" would not be displayed in the first set of candidates, but a candidate marked with " . . . " would be displayed and upon selection or touching of said candidate the candidates associated with "hello", "hell", "held", "help", "Helen" and "helicopter" would be displayed. In the first set candidates related to wordstems starting with "l" would be displayed.

In one embodiment the controller is configured to display a set of candidates where the candidates are predictions of the next word to be input taking into account the previous words input. In one embodiment the word prediction is based on more than one already input word.

In one embodiment the word prediction is based on the context of the previous input words. For example, if the user has previously input words relating to trains, or if the user is replying to a message containing words relating to trains, the controller is configured to provide prediction candidates that are related to trains.

In one embodiment the controller is configured to provide candidates relating to more than one word. In one embodiment the plurality of words relating to a candidate have one meaning when combined. Examples of such words are "train station", "ticket line", "picket fence"

In one embodiment the controller is configured to display candidates relating to both word predictions and to word-stems.

Figure 9A:
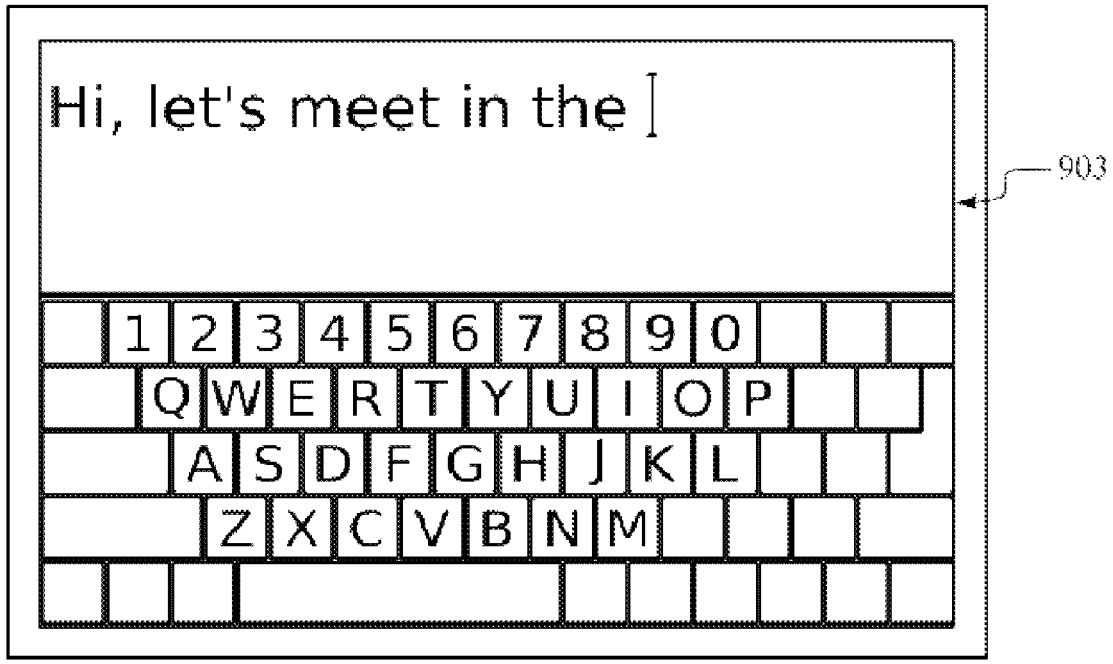
Figure 9B:
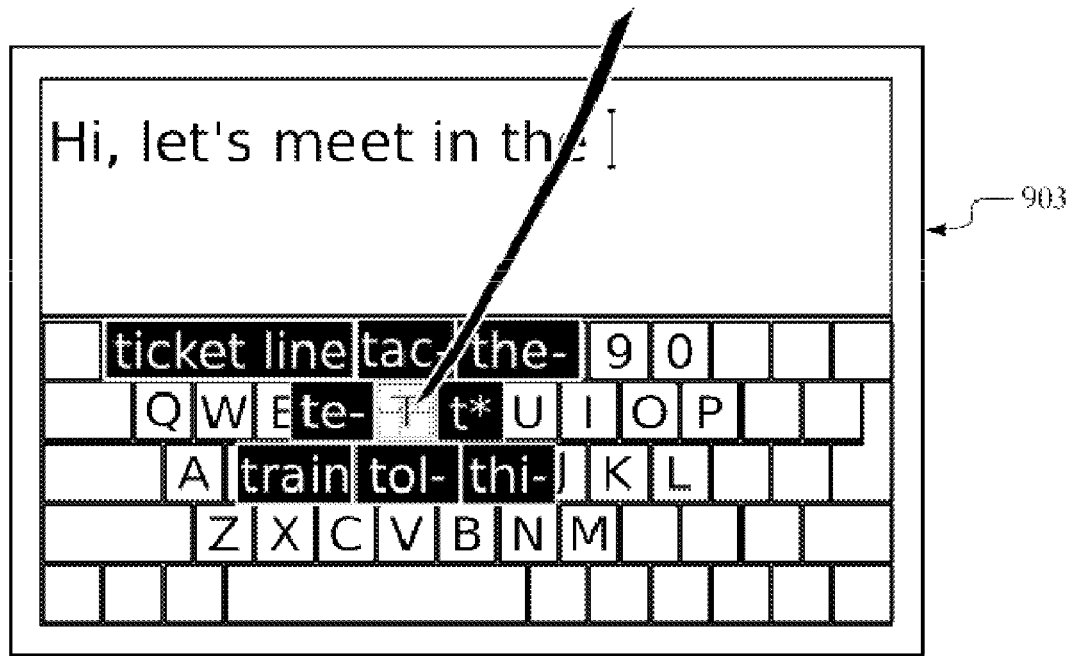

FIG. 9a shows a screen view 903 of an apparatus (not shown) where a user has previously input the words: "Hi, let's meet in the" in response to a message containing the word "train". The controller is configured to receive touch input relating to a letter and in response thereto present candidates that start with the letter. FIG. 9b shows a display view as a user touches on a virtual key associated with the letter 't'. The controller displays a set of candidates associated with the words "train" and "ticket line" as well as the wordstems "tac", "tol", "te", "the", "thi" and a candidate for displaying a second set marked "t*", see FIG. 9b.

Figure 9C:
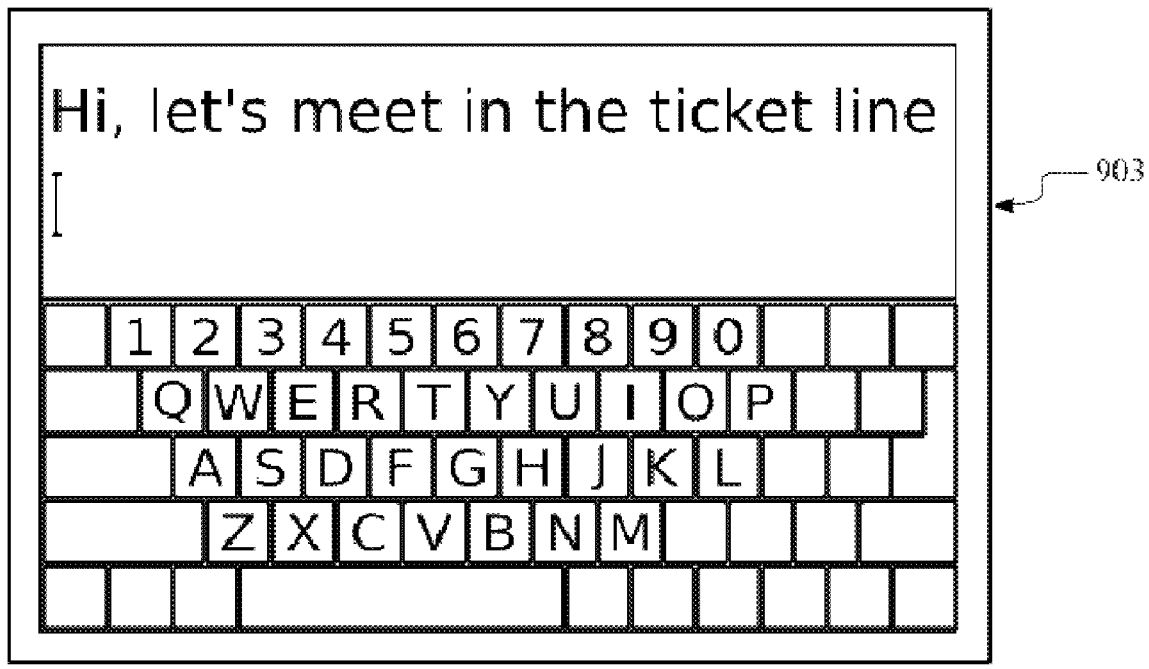

As the user touches on a candidate the controller is configured to input the word(s) associated with the candidate as described for the above embodiments, see FIG. 9c where the candidate associated with "ticket line" has been selected.

In one embodiment a candidate set comprise a candidate which is associated with a set of candidates all being word predictions. In one embodiment such a candidate is marked with " . . . ". In the example above the words "train" and "ticket line" would not be displayed in the first set of candidates, but a candidate marked with " . . . " would be displayed and upon selection or touching of said candidate two candidates associated with "train" and "ticket line" would be displayed.

In one embodiment the candidates associated with prediction are static.

In one embodiment the candidates associated with prediction are dynamic and change according to usage. Examples of usage criteria for changing a candidate is frequency of use or application data such as stored passwords for example or application specific word combinations dictated by the application.

In one embodiment each candidate is associated with a direction and a controller is configured to receive input indicating a direction and to identify a candidate in accordance with said direction. In such an embodiment a user does not have to move a stylus or other input means all the way to a candidate. It is only necessary to indicate the direction of the wanted candidate. This is especially useful for longer sets comprising long candidates. If for example the top row three candidates are "helicopter", "helienecephalitis" and "helicultural" the distance from the touch point associated with the letter to the right-hand candidate is very long and the user will most likely have to move the stylus through another candidate to reach the wanted candidate. In this embodiment each candidate is associated with a direction left-up="helicopter", up="helienecephalitis" and right-up="helicultural". A user then only has to move the stylus diagonally up and right to identify "helicultural" as the wanted candidate. In one example embodiment with eight candidates each candidate will be associated with the directions, up-left, up, up-right, right, down-right, down, down-left and left. In one example embodiment with six candidates each candidate will be associated with the directions, up-left, up-right, right, down-right, down-left and left. It should be noted that there are many alternatives to how the candidates can be arranged and associated with a direction and this depends on issues such as screen size, keypad layout, number of candidates, size of stylus etc.

In one embodiment the directions associated with each candidate are indicated graphically close to the actual touch point. In FIG. 10, see below, the indication is made by a segmented circle 1060. Each segment 1065 represents a direction and if a stylus 1040 or finger is moved into that segment 1065 the candidate associated with the direction represented by the segment 1065 is selected.

In some cases a candidate may be blocked from a user's view by the stylus used and in such cases it would be beneficial if the actual candidates are displayed offset from the touch point. In such an embodiment all movements made by the stylus would be received in one area located around the identified letter, but interpreted to have been made in the area of the displayed candidates.

A user would thus be able to see all candidates clearly while still only having to do simple and uninterrupted gestures or strokes to input a character string.

FIG. 10 shows an alternative apparatus 1000 according to the teachings herein. It should be noted that such an apparatus can be any apparatus or device capable of receiving text input.

The apparatus 1000 has a display 1003, which in this example is a touch display 1003, and a keypad 1004 which in this example is a virtual QWERTY keypad 1004 being displayed on the touch display 1003.

Figure 10A:
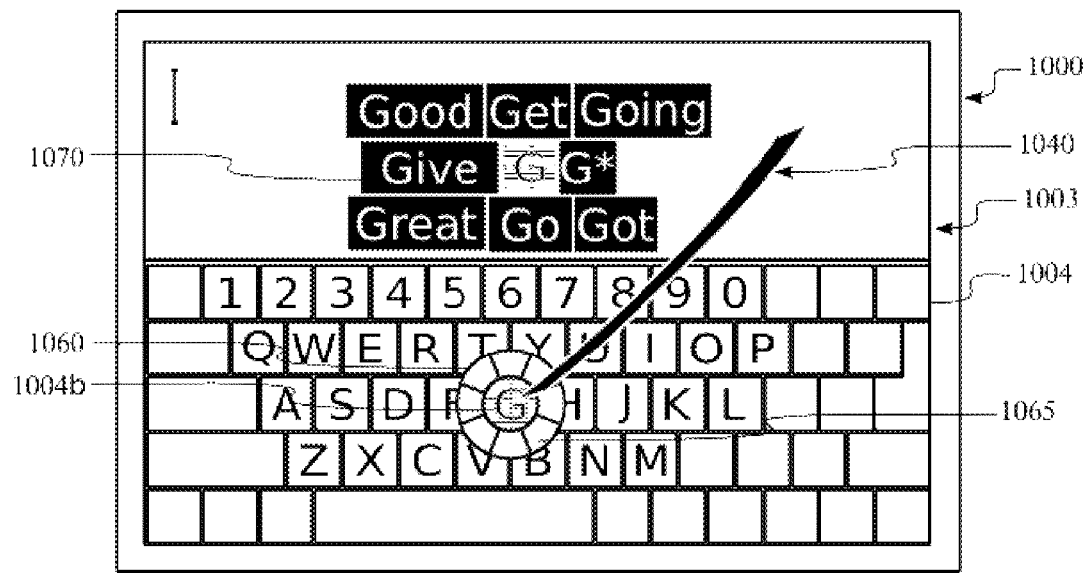

In FIG. 10a a user has touched on a virtual key 1004b being associated with a letter 'G' and a controller has responded by displaying a set of candidates being associated with the letter 'G'. In this example the candidates are "Good", "Get", "Going", "Give", "G*", "Great", "Go" and "Got".

Also displayed in FIG. 10a is a graphical direction indicator 1060 which indicates in which direction a stylus should be moved to select a candidate. In this embodiment all candidates are associated with a direction. In this example the associations are "Good"—up-left, "Get"—up, "Going"—up-right, "Give"—left, "G*"—right, "Great"—down-left, "Go"—down and "Got"—down-right.

It should be noted that displaying the direction indication is optional and may be set by the designer or by the user.

In one embodiment the offset displayed candidate set 1070 is displayed around a projected touch point. In one such embodiment using a touch display 1003 the controller is configured to map a received touch point to a projected touch point being displayed offset the received touch point.

Figure 10B:
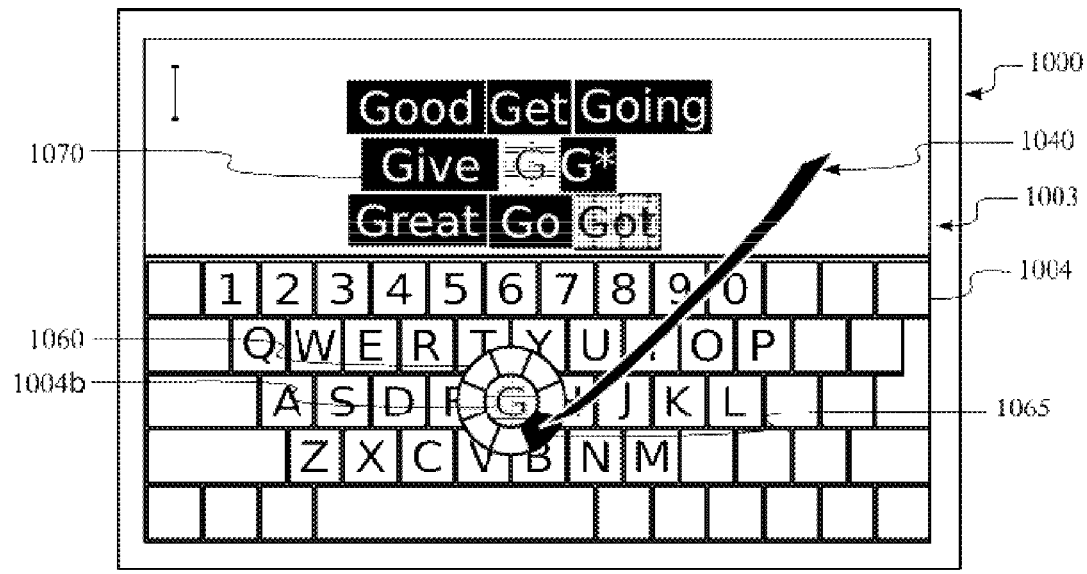

In FIG. 10b a user has moved the stylus 1040 down and right into the segment 1065 representing the direction down-right. In this example the candidate "Got" is associated with this direction.

A controller is configured to receive the movement of the stylus and determine a direction and from this direction determine which of the candidates in the displayed set is associated with this direction and identify this candidate as a first candidate.

The identified first candidate "Got" is marked in the offset displayed candidate set 1070 to notify the user of which candidate that has been identified for selection.

In this embodiment the marked candidate is marked by shadowing the graphical representation of the candidate. It should be noted that other markings are possible as has already been discussed herein.

In an alternative embodiment the candidates are displayed around a touch point leaving the lower-right corner empty or void of candidates which is suitable for right-hand users.

In an alternative embodiment the candidates are displayed around a touch point leaving the lower-left corner empty or void of candidates which is suitable for left-hand users.

It should be noted that all features described with reference to FIGS. 4 to 10 may all easily be combined according to design criteria.

FIG. 11 shows an alternative apparatus 1100 according to the teachings herein. It should be noted that such an apparatus can be any apparatus or device capable of receiving text input.

The apparatus 1100 has a display 1103 and a touchpad 1105.

In one embodiment the touchpad 1105 is incorporated in the apparatus 1100.

In one embodiment the touchpad 1105 is separate from the apparatus 1100.

FIG. 11 shows a keypad being displayed on the display 1103. The controller is configured to receive input through the touch pad 1105 and map this against the content being displayed on the display 1103. As is commonly known the touchpad 1105 can thus be used to control the content on the display 1103.

The controller is configured to project a touch point of the touch point to a projected touch point on the display 1103.

The controller is further configured to receive input via the touchpad 1105 identifying a key 1104a being comprised in the displayed keypad 1104. Said key 1104a is associated with a letter and the controller is further configured to display a set of candidates which are associated with wordstems starting with the letter being associated with the identified key.

Figure 11A:
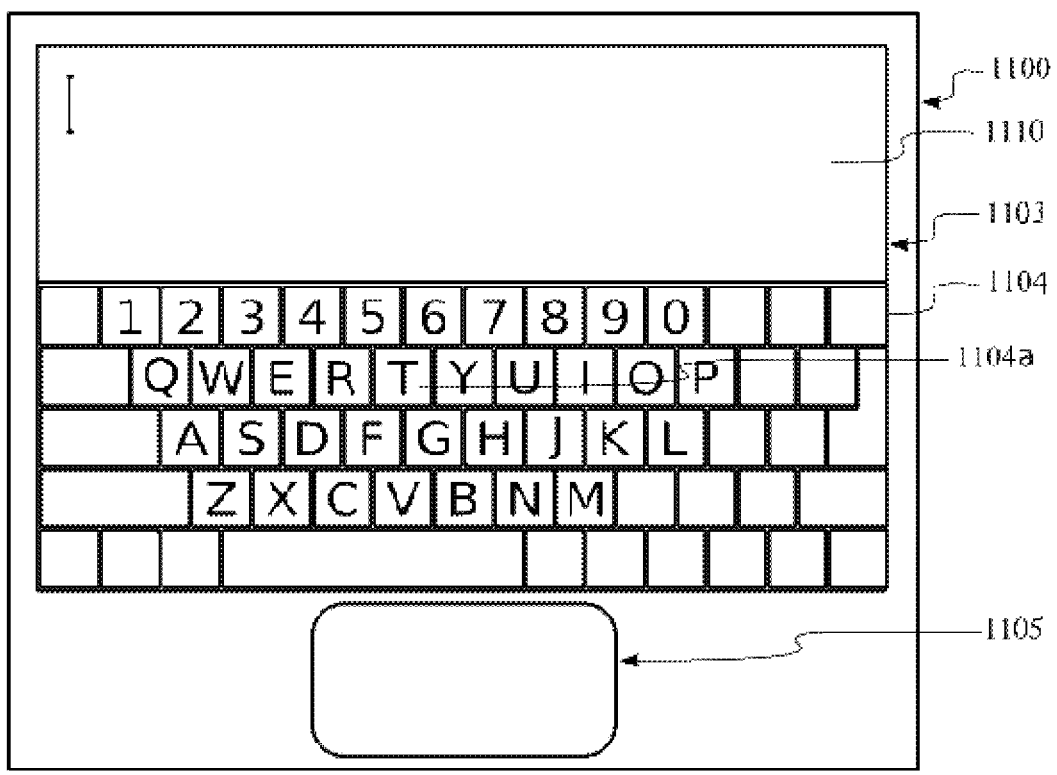
Figure 11B:
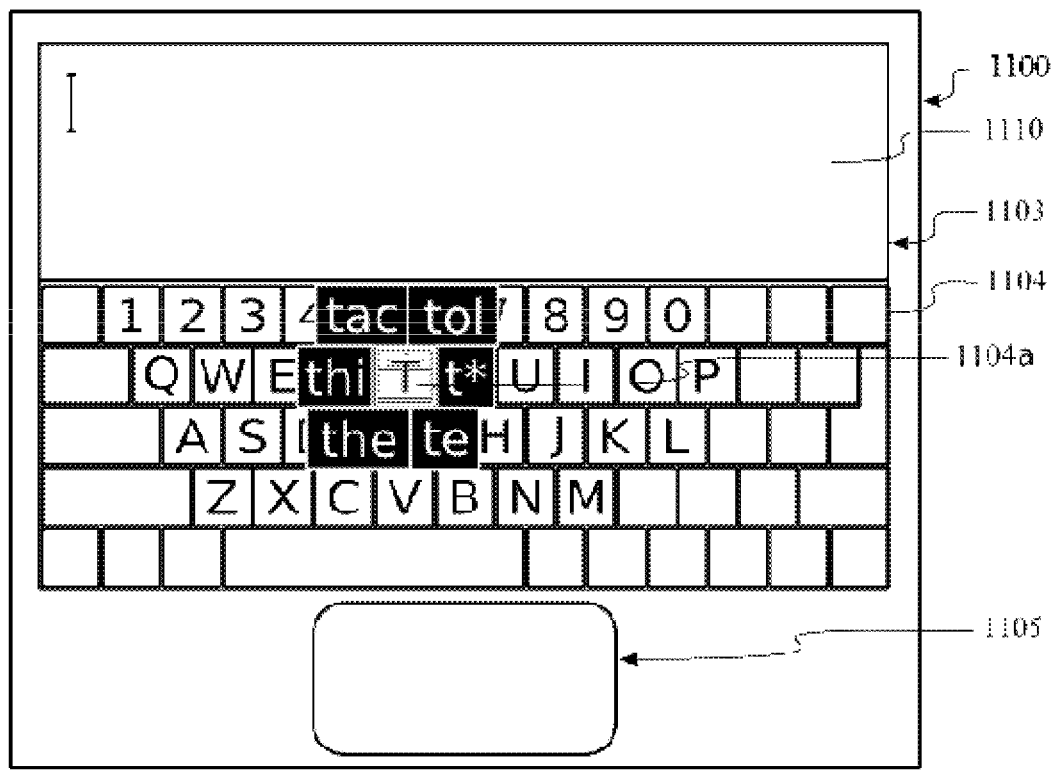

In FIG. 11b a user has touched on the touchpad 1105 in a position that is mapped to the key being associated with the letter 't'. The controller has displayed a set of candidates in response thereto. The candidates are associated with the wordstems "tac", "tol", "te", "the", "thi" and "t*". In this example six candidates are displayed, but as has been described the number of candidates that are displayed depend on a number of design and runtime criteria.

In one embodiment the candidates are arranged around a projected touch point. In this example embodiment the candidates are displayed around the mapped position on the display for the virtual key being touched.

It should be noted that all candidate possibilities described with reference to the embodiments above are possible to be implemented in the embodiments described with reference to FIG. 11.

Figure 11C:
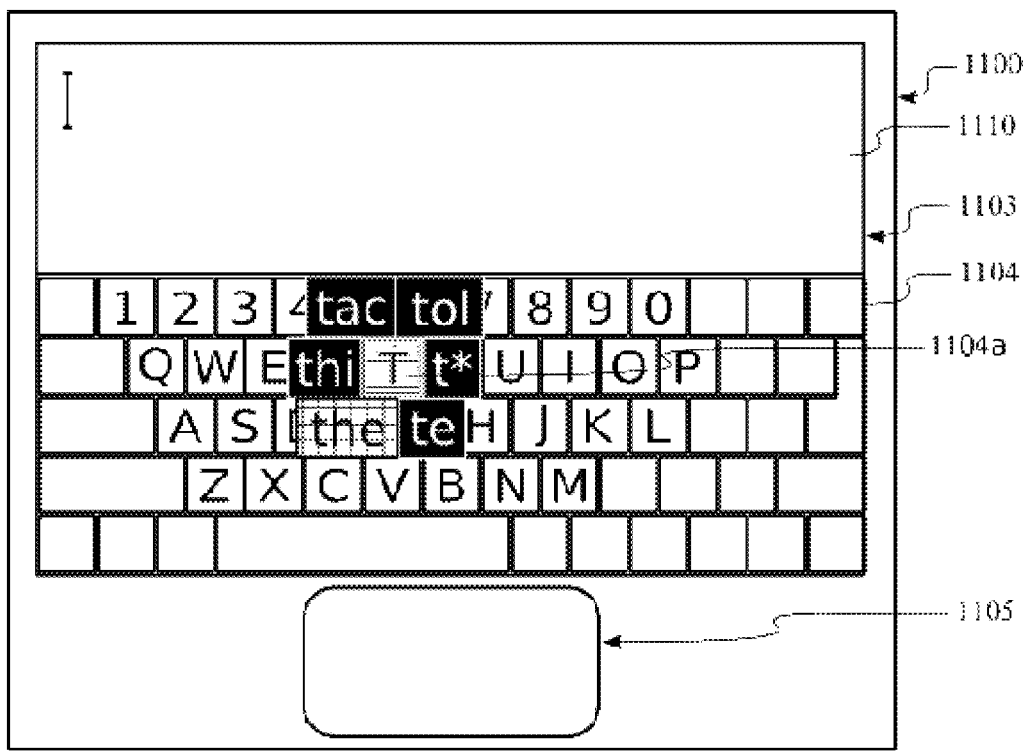

In FIG. 11c a user has slid the stylus on the touchpad 1105 to a position which is mapped to a position that is mapped to the wordstem "the".

In one embodiment the controller is configured to receive a select command and input a wordstem being associated with the currently identified candidate in response thereto.

Figure 11D:
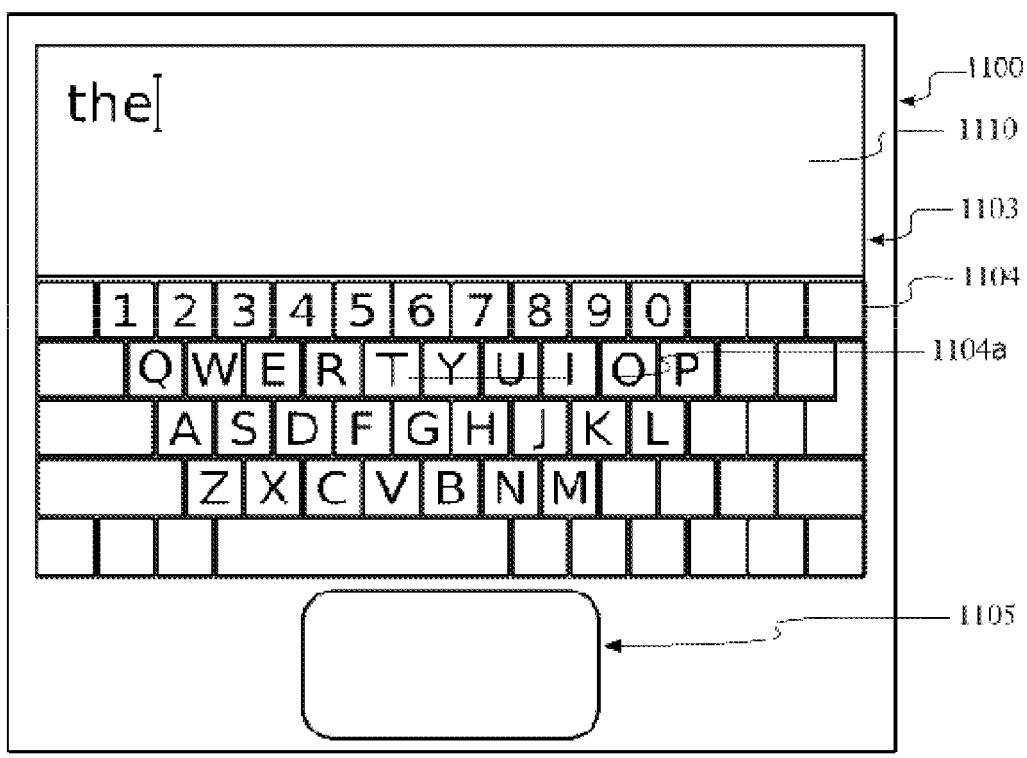

In FIG. 11d a user has released the stylus from the touchpad 1105 and the controller has input the wordstem "the" which is displayed in the text area 1110.

It should be noted that even though the embodiments above referring to FIG. 11 have been described as having mapped positions on the touchpad 1105 to the display 1103 it is also possible to use the touchpad to control a cursor which is moved over the display 1103 on which a keypad and/or a set of candidates are displayed.

FIG. 12 shows an alternative apparatus 1200 according to the teachings herein. It should be noted that such an apparatus can be any apparatus capable of receiving text input.

The apparatus has a display 1203 and an optical input device such as a camera 1230. Also shown in FIG. 12 is a paper 1220.

A controller (not shown) is configured to receive input from the camera 1230 and to detect any movements or gestures made over the paper. The controller is configured to interpret these movements as control signals.

By taking pictures of the paper the controller can determine if any movements have been made identifying a position on the paper 1220.

The controller is further configured to interpret the position indication on the paper as a position indication for content being displayed on the display 1203.

This provides for an apparatus using a paper as an alternative to a touchpad.

The input of text is achieved analogously as has been described in connection to the embodiments referring to FIG. 10.

Figure 12A:
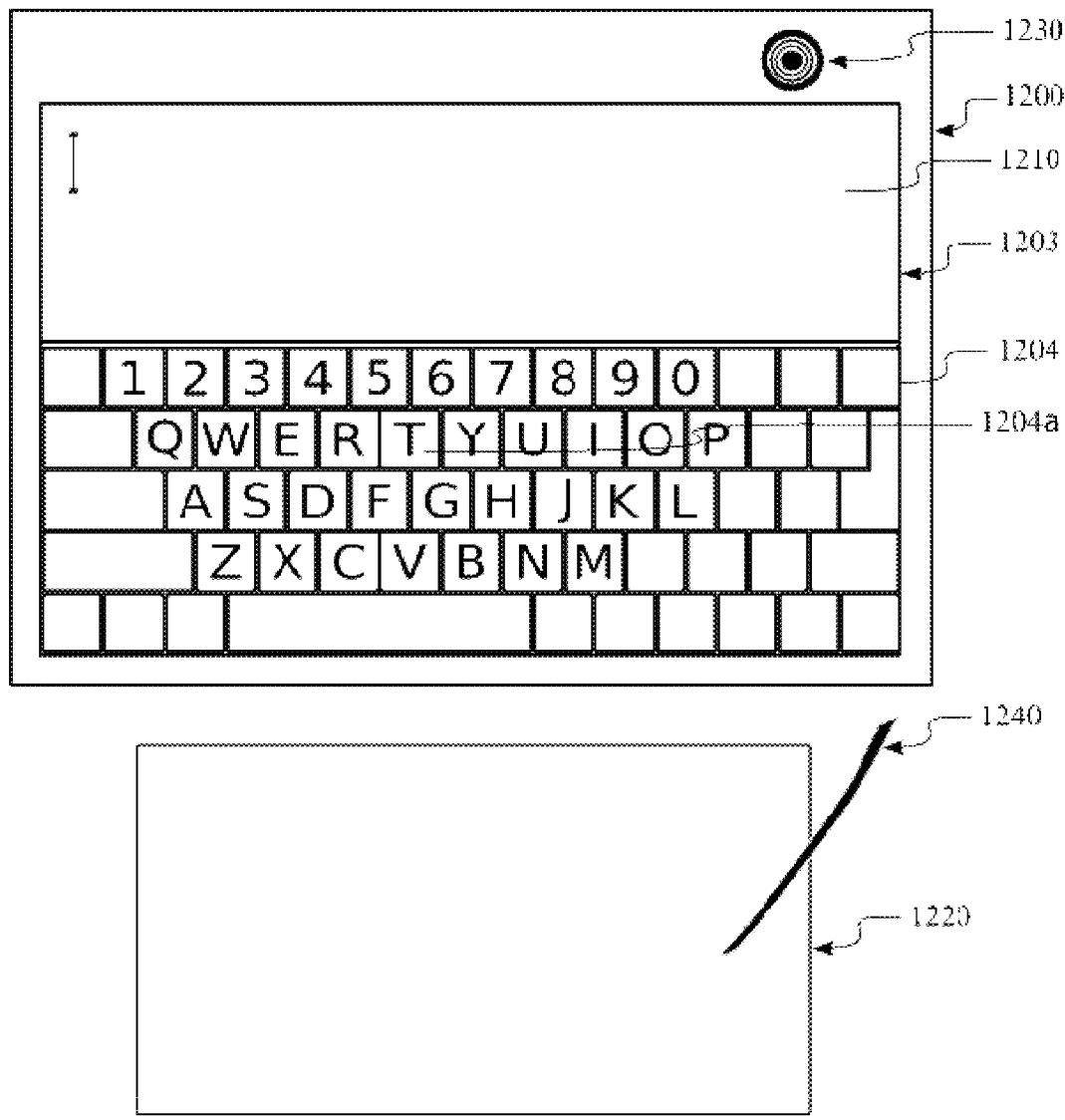

FIG. 12a shows an apparatus 1200 where a QWERTY style keypad 1204 is displayed on the display 1203.

In FIG. 12a a user is pointing on a position on the paper 1220 which is mapped to a position on the display 1203 corresponding to a key 1204a of the displayed keypad 1204 with a stylus 1240. Said key 1204a is associated with a letter and the controller is further configured to display a set of candidates which are associated with wordstems starting with the letter being associated with the identified key.

In one embodiment the candidates are arranged around a projected touch point. In this example embodiment the candidates are displayed around the mapped or indicated position on the display for the virtual key being touched.

Figure 12B:
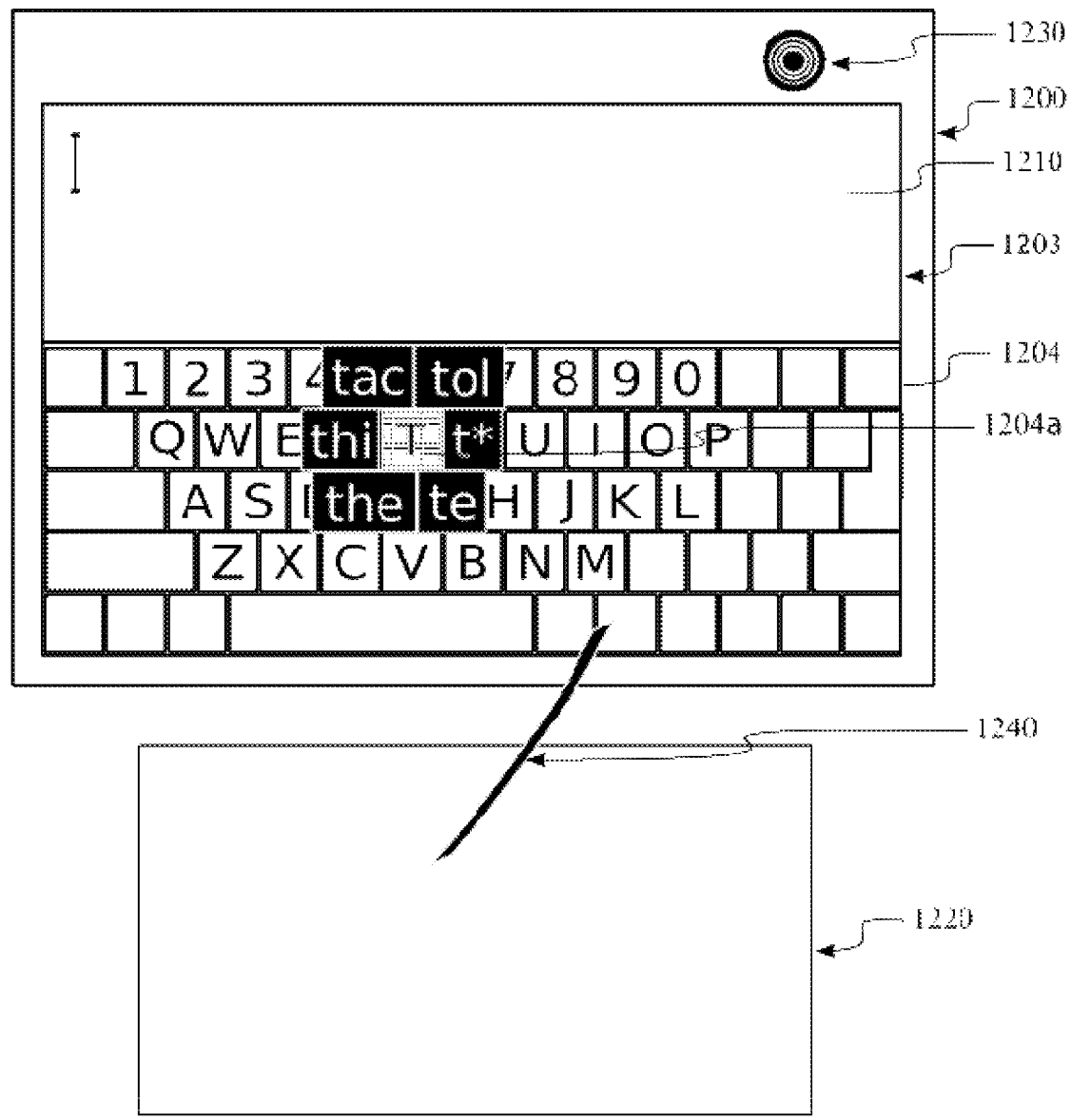

In FIG. 12b a user has touched on the paper 1220 in a position that is mapped to the key being associated with the letter 't'. The controller has displayed a set of candidates in response thereto. The candidates are associated with the wordstems "tac", "tol", "te", "the", "thi" and "t*". In this example six candidates are displayed, but as has been described the number of candidates that are displayed depend on a number of design and runtime criteria.

It should be noted that all candidate possibilities described with reference to the embodiments above are possible to be implemented in the embodiments described with reference to FIG. 12.

Figure 12C:
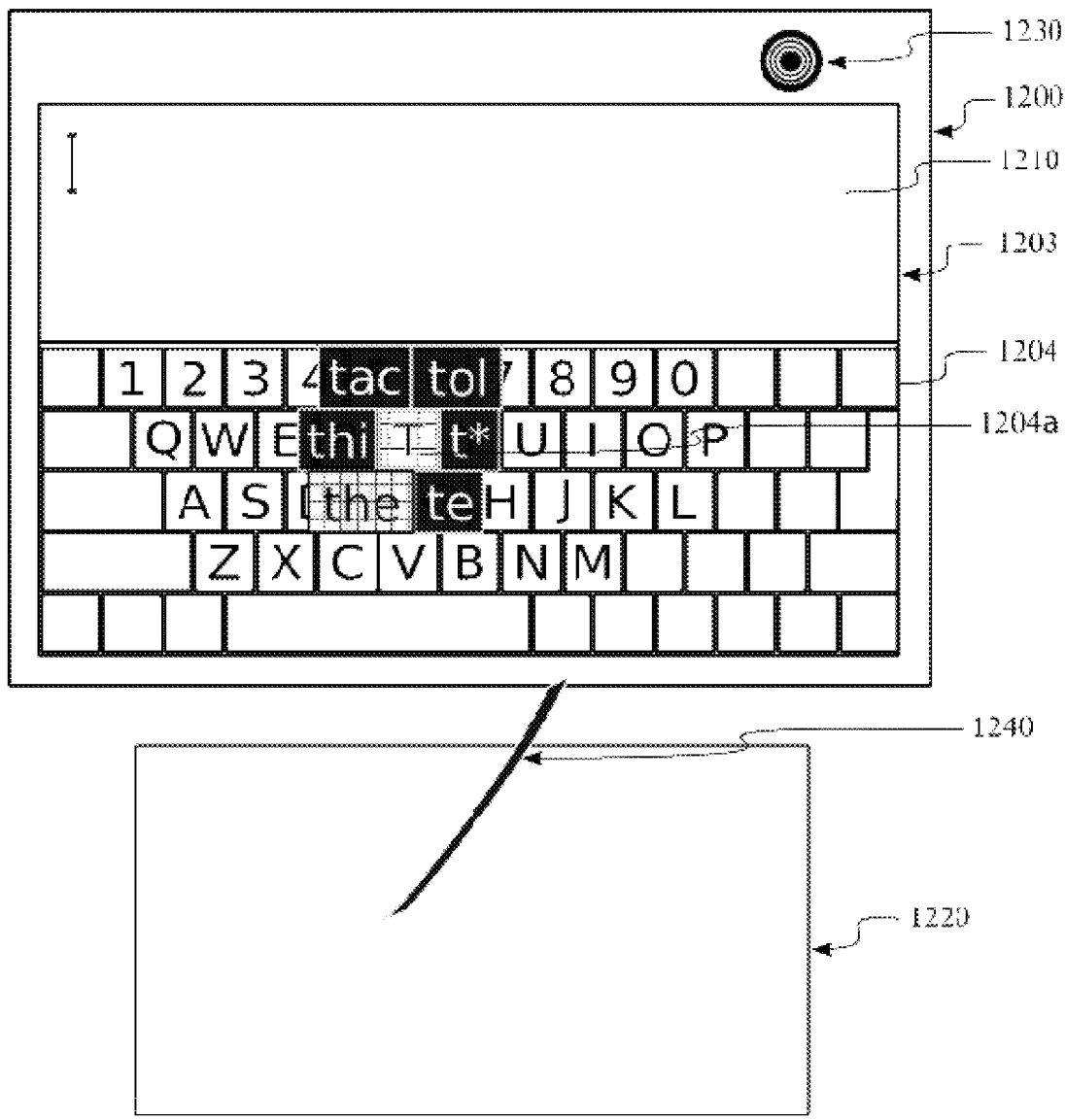

In FIG. 12c a user has slid the stylus over the paper 1220 to a position which is mapped to a position that corresponds to a candidate that is associated to the wordstem "the".

In one embodiment the controller is configured to receive a select command and input a wordstem being associated with the currently identified candidate in response thereto.

Figure 12D:
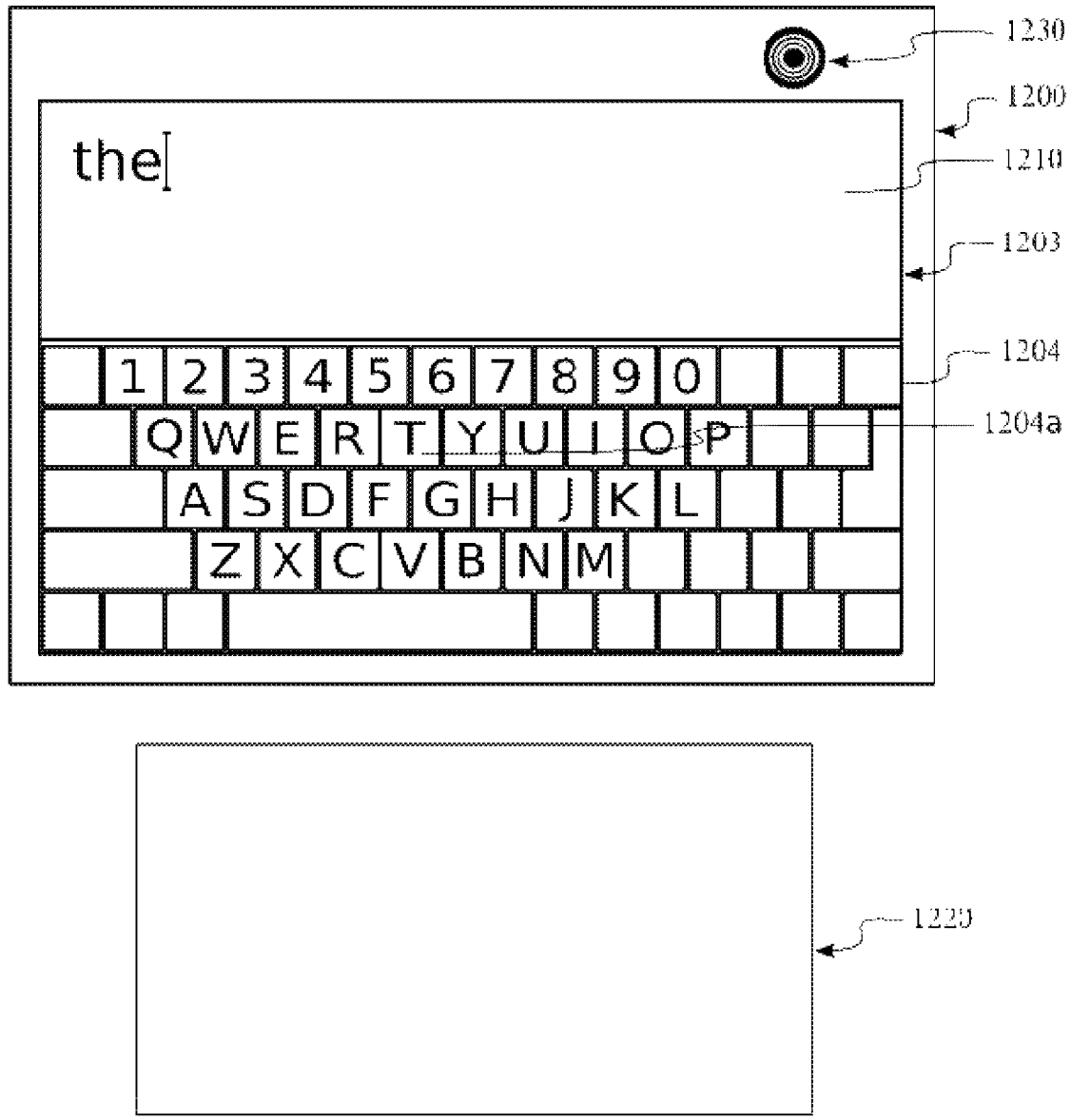

In FIG. 12d a user has released the stylus from the paper 1220 and the controller has input the wordstem "the" which is displayed in the text area 1210.

In one embodiment the controller is further configured to determine the distance of stylus, finger or other pointing implement 1240 from the paper 1220 and to determine whether a pressing action is being exerted by a user.

In such an embodiment the controller can differentiate between touching and pressing analogously as has been described above with reference to FIG. 10.

In one embodiment the apparatus is further configured with a projector (not shown). The controller is configured to display a keypad 1204 using the projector. By placing the paper 1220 in the projection area a view of the keypad 1204 can be aligned with positions on the paper 1220 mapped to the displayed content so that a user is given a visual guidance of where to put the stylus.

FIG. 13 shows an alternative apparatus 1300 according to the teachings herein. It should be noted that such an apparatus can be any apparatus capable of receiving text input.

The apparatus comprise a display 1303 and a control input means 1340. The control input means comprise a motion detector (not shown). Motion detectors are commonly known in the prior art so no further description of its internal function will be given here. In FIG. 13 the control input means are only shown once with arrows indicating that it is communicating with the apparatus shown. This is merely for illustrative reasons.

A controller is configured to display a keypad 1304 comprising a plurality of keys on said display 1303. At least one of the keys 1304a is associated with a letter. The controller is configured to display a cursor 1345 on the display, see FIG. 13a.

The controller is configured to receive motion signals from the motion sensor and to interpret these as cursor control signals.

This offers a user a possibility to control the cursor by moving the control input means.

A controller is further configured to display a set of candidates which are associated with wordstems starting with a letter being associated with an identified key.

Figure 13A:
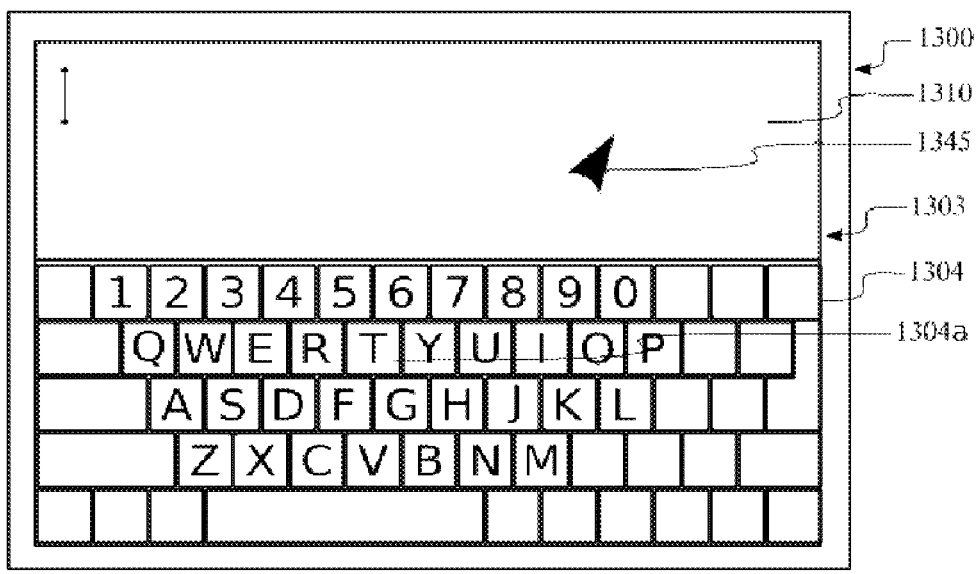
Figure 13A:
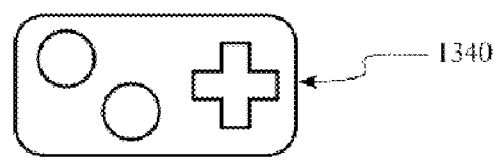
Figure 13B:
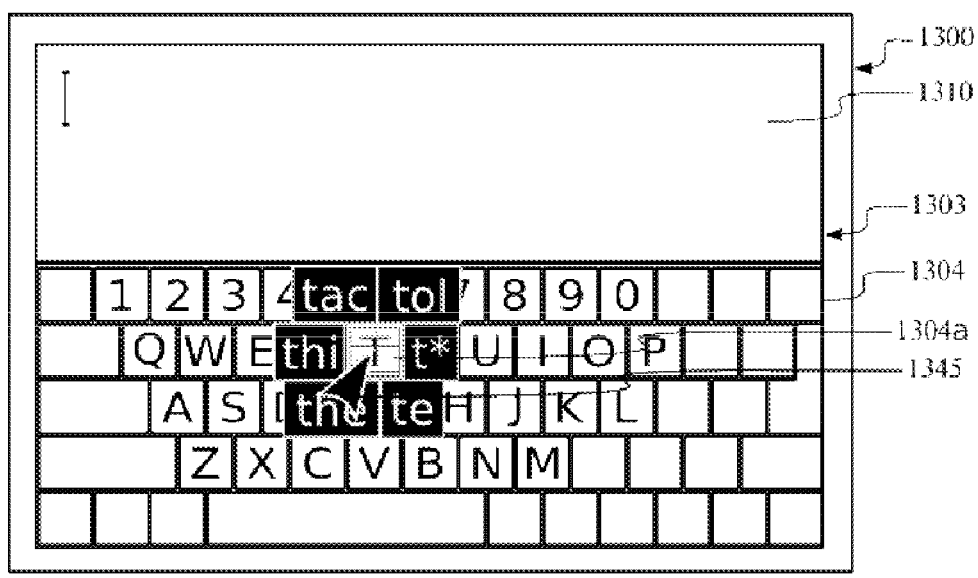
Figure 13B:
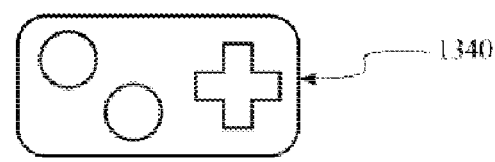

In FIG. 13b a user has positioned the cursor 1345 over a key 1304a in the displayed keypad 1304 identifying the key 1304a. In this example the key 1304a is associated with a letter 't' and the controller has displayed a set of candidates in response thereto. The candidates are associated with the wordstems "tac", "tol", "te", "the", "thi" and "t*". In this example six candidates are displayed, but as has been described the number of candidates that are displayed depend on a number of design and runtime criteria.

In one embodiment the candidates are arranged around a projected touch point. In this example embodiment the candidates are displayed around the virtual key over which the cursor has been positioned.

It should be noted that all candidate possibilities described with reference to the embodiments above are possible to be implemented in the embodiments described with reference to FIG. 13.

Figure 13C:
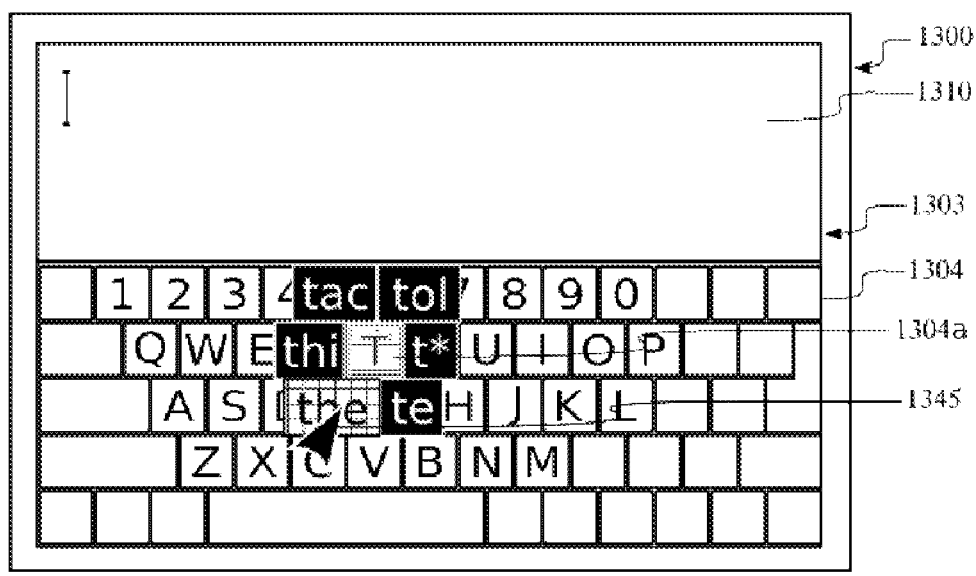

In FIG. 13c a user has positioned the cursor over a candidate that is associated to the wordstem "the".

In one embodiment the controller is configured to receive a select command and input a wordstem being associated with the currently identified candidate in response thereto.

In one embodiment the controller is configured to interpret a received motion signal representing a specific gesture as a select command. In such an embodiment a user can select a candidate by shaking the control input means 1340.

In one embodiment the control input means 1340 comprises a select key (not show) and the controller is configured to receive an input from the select key and to interpret the input as a select command.

Figure 13D:
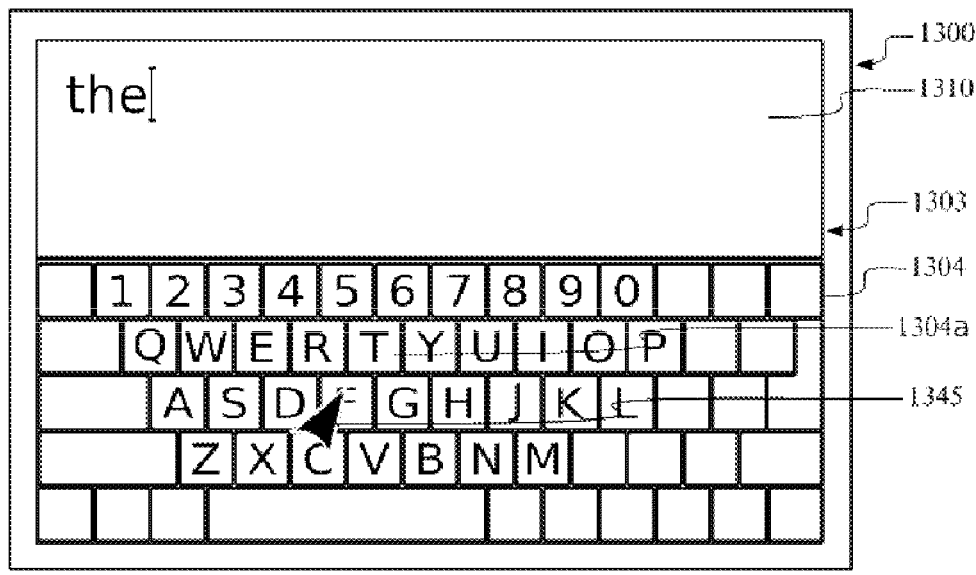

In FIG. 13d a user has pressed the select key and the controller has input the wordstem "the" which is displayed in the text area 1310.

FIG. 14 shows an alternative apparatus 1400 according to the teachings herein. It should be noted that such an apparatus can be any apparatus capable of receiving text input.

The apparatus 1400 has a display 1403 and a keypad 1404. In one embodiment the keypad 1404 is a QWERTY style keypad.

A controller (not shown) is configured to receive input identifying or referring to a key. The input is generated by a user pressing or tapping on a key 1404a of the keypad. At least a plurality of the keys of the keypad 1404 are associated with a letter.

In one embodiment the keypad 1404 comprise touch sensitive keys. Such keys are capable of sensing if a key is touched or not without the key being pressed. In the following example there will be no distinction being made between touching a touch sensitive key and pressing a key.

Figure 14A:
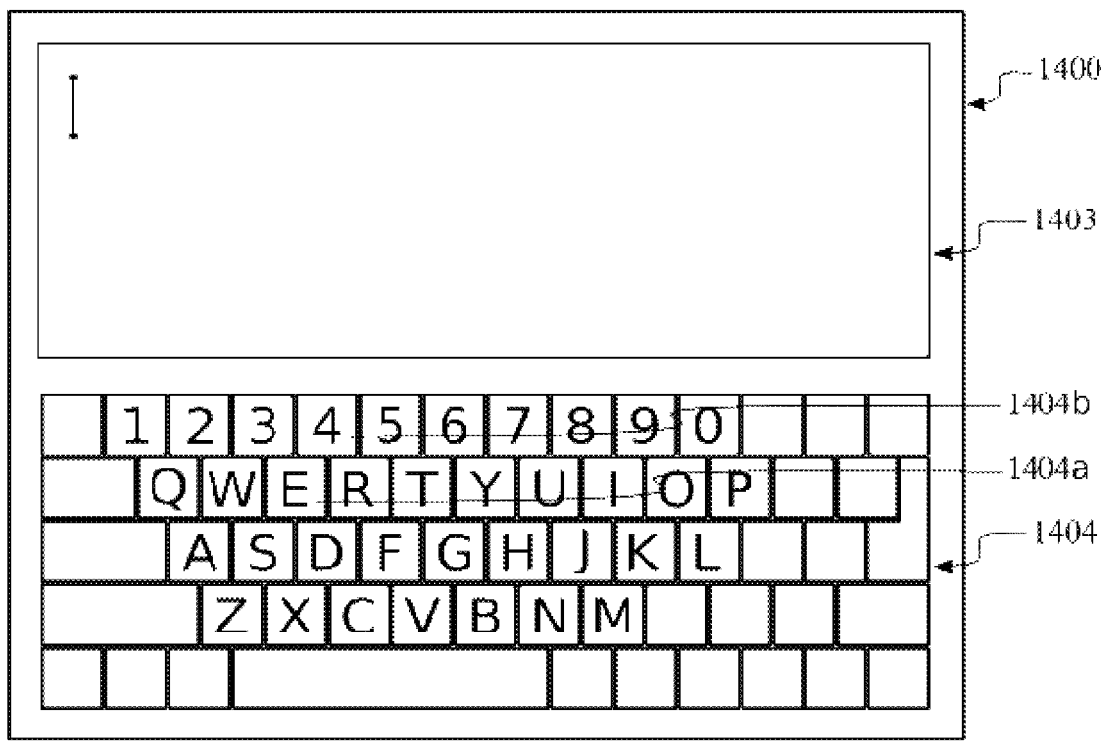

In the example embodiment of FIG. 14a the key associated with the letter 'e' is pressed.

The controller is further configured to display a set of candidates relating to the identified letter in response to receiving the input. In one embodiment as described above, the candidates are associated with a word or wordstem such as a prefix or suffix starting with the letter identified.

In one embodiment the candidates are arranged around a projected touch point for the physical keys that are mapped to positions on the display. In this example embodiment the candidates are displayed around the mapped position on the display corresponding to the key being touched.

Figure 14B:
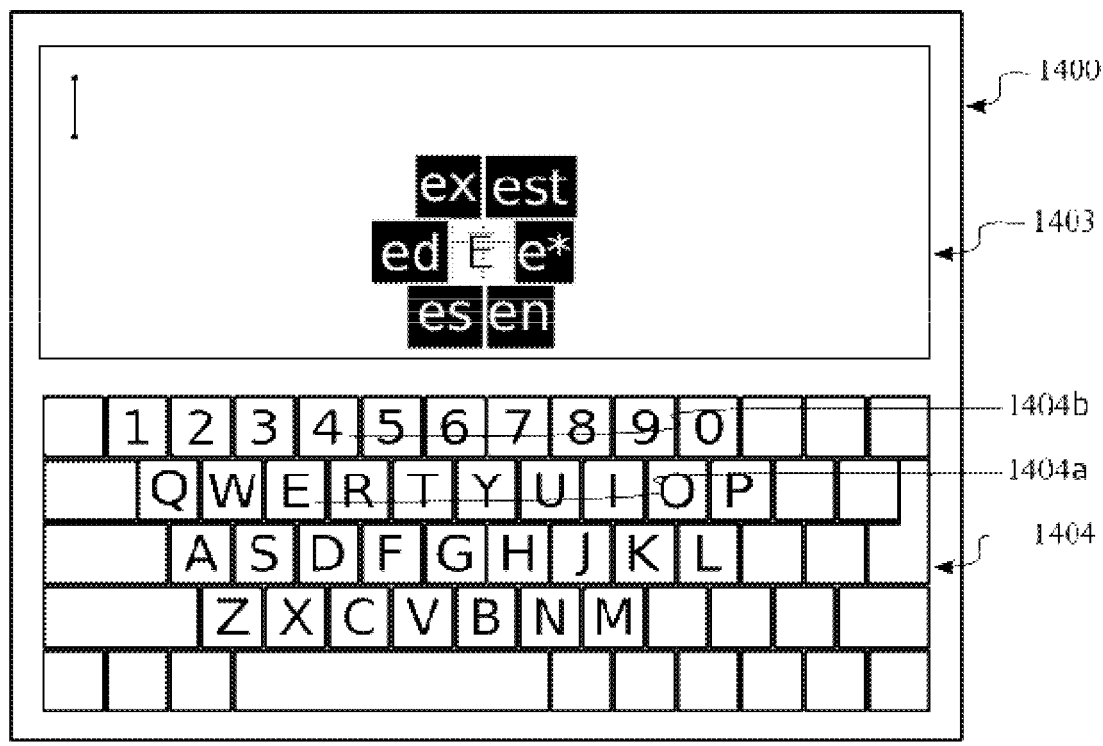

In one embodiment a set of six candidates are shown for the identified letter, see FIG. 14b. As a QWERTY style keypad surrounds most keys (except the edge keys) with six other keys it is easy and intuitive to map the candidates to the surrounding keys.

In this example the candidates "ex", "est", "en", "ed", "es" and "e*" are displayed. As is described above the candidate marked "e*" is associated with a second set of candidates.

The controller is further configured to receive a select command of a candidate and in response thereto input the associated wordstem.

Figure 14C:
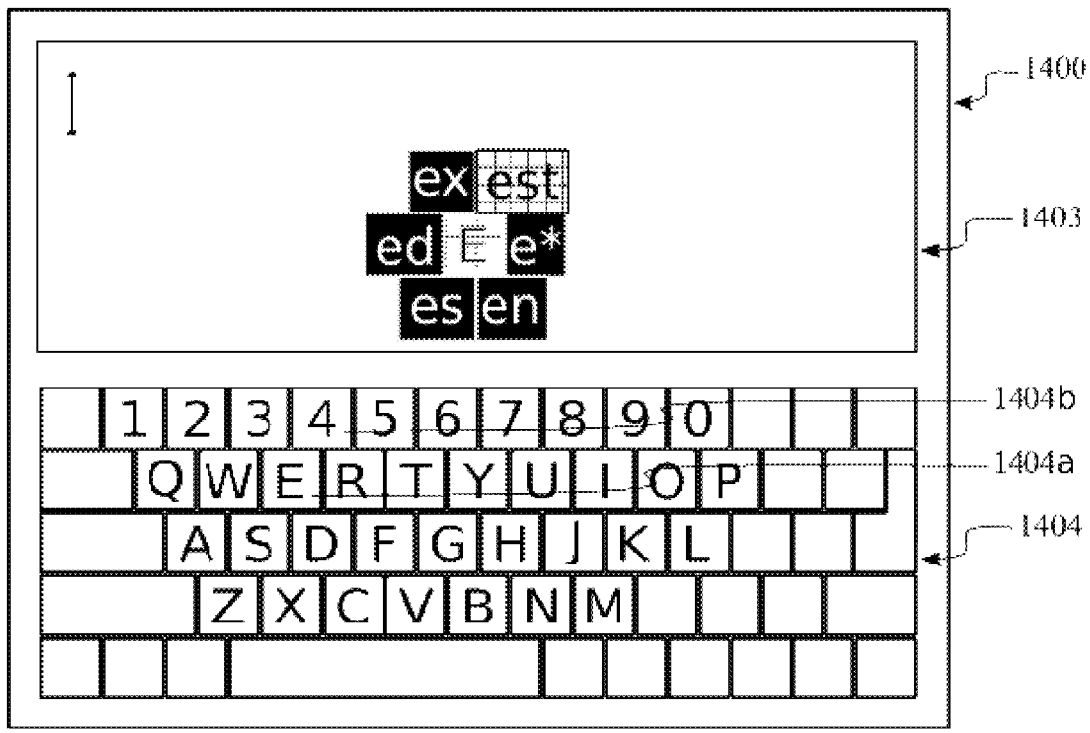
Figure 14D:
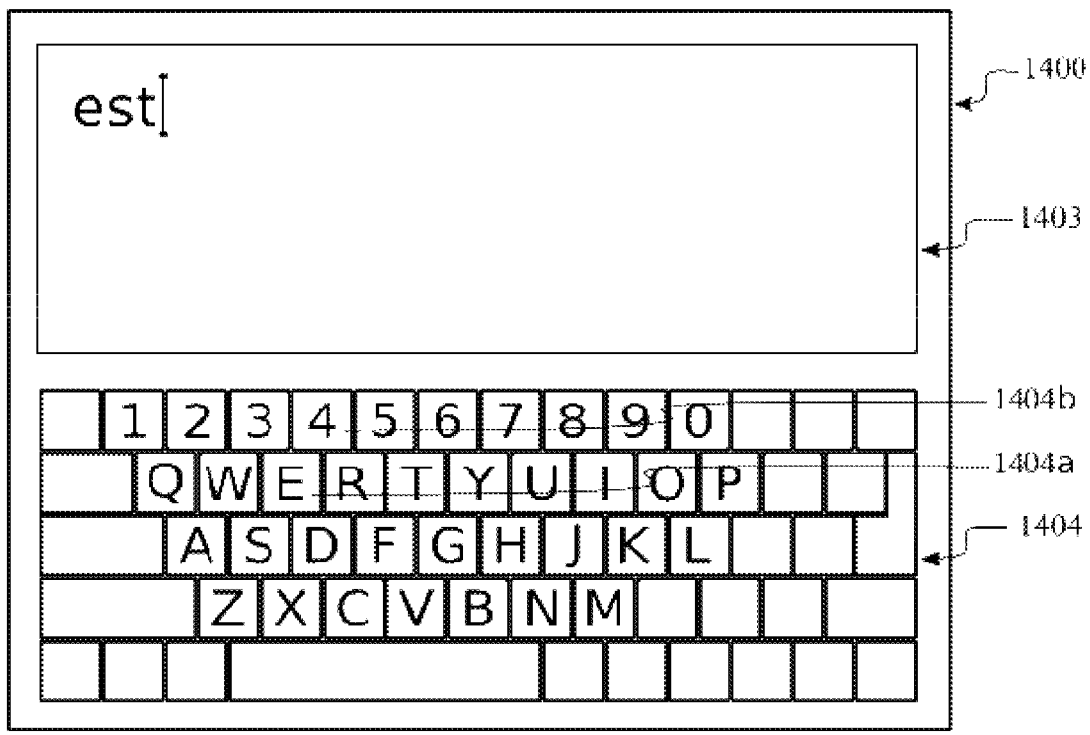

In FIG. 14c a user has pressed on the key 1404b marked '4' which is mapped to the candidate associated with "est" which has been input and is displayed on the display 1403 in FIG. 14d.

In a further embodiment the controller is configured to display a further set of candidates for a candidate in the same way as has been described in relation to the embodiments above.

In one embodiment the controller is configured to differentiate between a key press and a touch of a physical key. In such an embodiment a select command is input by pressing a key. In an alternative such an embodiment a select command is input by releasing a key.

In such an embodiment the controller is configured to input a letter associated with said pressed key if it is pressed and to input a wordstem associated with a candidate if the corresponding keys are merely touched.

This allows a user to input letters in the common way by pressing keys and to input wordstems, word completions or word predictions by touching on the keys or floating over them. This provides for the same swift, simple and easy way of inputting text as has been described for the embodiments having a touch display.

In one embodiment compatible with all described above a controller is configured to display a candidate set associated with a key or a candidate after the controller has determined that the input has been resting on top of the key or candidate for a time period being longer than a pre-determined threshold time limit.

In such an embodiment a candidate set will be displayed for a virtual key being associated with a letter if the user touches on the virtual key and allows the stylus to rest on the virtual key for a time period.

In one embodiment a pressure sensitive input device is utilized. Examples of such pressure sensitive input devices are pressure differentiated touch displays, touch pads and keypads. The key feature of such input devices is as skilled readers will realize that they are capable of providing different input depending on the pressure applied to them.

In one such embodiment the selection of a candidate is effected by a user through applying additional pressure over the candidate.

In one alternative that may be combined a controller is configured to receive an input representing an elevated pressure level and in response thereto display a set of candidates associated with the current position of the input. In such an embodiment a user is able to cause the controller to display a candidate set by pressing harder on a letter or a candidate.

Using pressure sensitive and differentiating input devices such as these have the advantage that the input can be made quick as no timing issues are dealt with.

In one embodiment an ITU-T keypad is utilized (ITU-T is a standardization body for the International Telecommunication Union).

In one embodiment an apparatus comprises a touch display and the keypad is a virtual keypad displayed on the touch display.

A normal ITU-T keypad comprises 12 keys as is commonly known. Of these twelve keys eight are associated with characters. This leads to that a press on a key is ambiguous as to which character should be input.

In one embodiment a controller is configured to receive multitap input for a key which key is associated to a plurality of characters and the multitap identifies one of these characters. The number of taps correspond to the order in which the character is displayed on the key.

In one embodiment the characters associated to each key are further associated with a direction on their corresponding key. In one embodiment a character can be associated to no direction. A controller is configured to receive a direction indication for a key, said key being associated with a plurality of characters, said direction indication identifying a character being associated with that direction. In one embodiment the characters are displayed in a row where a keypress without direction identifies the middle character, a keypress indicating left identifies the left character and a keypress indicating right identifies the right character. In one embodiment a keypress indicating up identifies the second character, a keypress indicating down identifies the third character if four characters are associated with the key, a keypress indicating left identifies the first character and a keypress indicating right identifies the fourth character if four characters are associated with the key and if only three characters are associated with the key a keypress indicating right identifies the third character.

In an example according to this embodiment the characters 'a', 'b' and 'c' are each associated with a key. In this example 'a' is associated with left, 'b' is associated to no direction and 'c' is associated with right. A user presses on the key and slides or tilts to the left indicating a left direction. The controller receives 'a' in response thereto. A user presses on the key and releases indicating no direction. The controller receives 'b' in response thereto. A user presses on the key and slides or tilts to the right indicating a right direction. The controller receives 'c' in response thereto.

The controller is configured to display a candidate set in response to receiving input identifying a character.

In one embodiment the candidates are displayed in order so that they are mapped to the keys of the keypad. In one embodiment the mapping for the key being associated with the number 5 is effected so that a press on the "5"-key causes the controller to input the identified character for which the candidates are displayed. A press on one of the other keypad keys will cause the controller to input the corresponding candidate.

In one embodiment a controller is configured to receive a double press or in an alternative embodiment a long press on a key and in response thereto display a further set of candidates being associated with a candidate associated with the key which was double or long pressed.

In one embodiment a navigation input key such as a joystick or four or five-way key is used to navigate between the candidates.

In one embodiment the candidates are displayed while the key is pressed.

In one embodiment where at least one key is associated with a plurality of letters the candidates provided are based on a prediction of the selected key or keys. One example is where an apparatus has an ITU-T keypad and the user has previously tapped on the keys '2' and '6'. As a controller receives input that the key '3' is identified the controller displays a set of candidates based on a prediction of the three keys. Generation of such prediction candidates using a predictive text engine is commonly known albeit not its use in a combination with an input method as has been disclosed herein. The candidates displayed "and", "cod", "2nd", "ame", "bod", "cof", "ane", "coe" and "boe". Should there not be enough space to display all candidates some candidates are arranged in a second set of candidates.

The size of the keypad used provides different advantages. A smaller keypad gives fewer starting points and allows a user to quickly find a starting point with a minimum of movements. A larger keypad allows for shorter paths to the wanted wordstem as the available candidates are distributed on more keys.

FIG. 15 shows an apparatus 1500. It should be noted that the apparatus 1500 can be any apparatus capable of text input.

The apparatus 1500 has a display 1503 and a keypad 1504. The keypad 1504 in this example is of the type ITU-T.

Figure 15A:
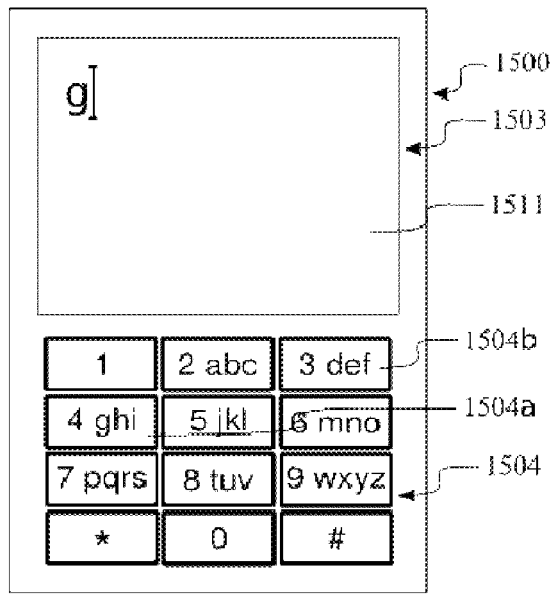
Figure 15B:
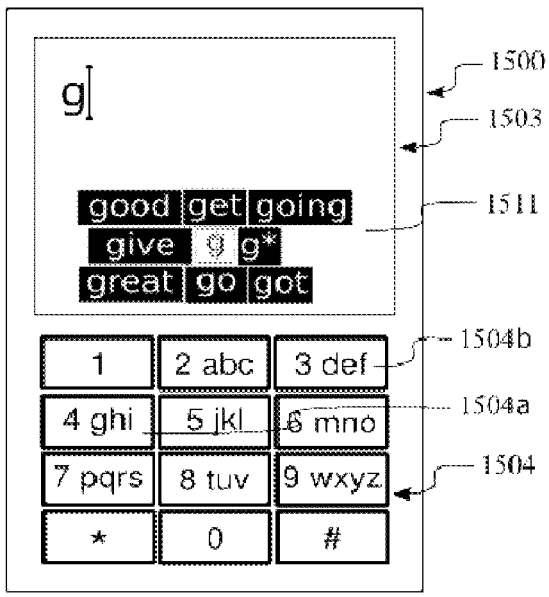
Figure 15C:
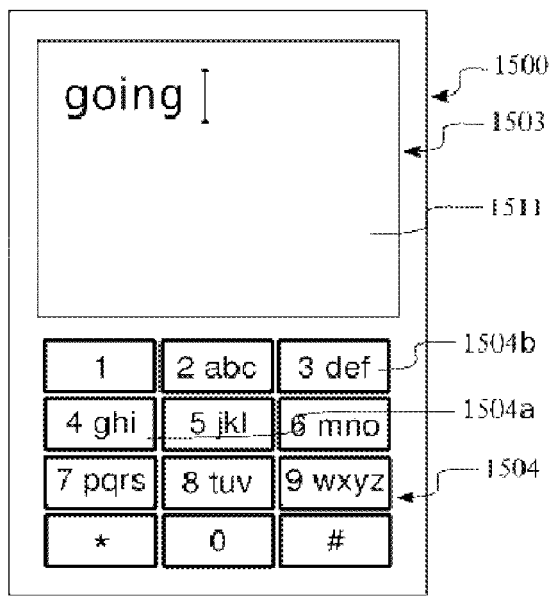

In FIG. 15a a user has pressed on a key 1504a marked "4". This key is traditionally associated with a plurality of letters and in this example the letters 'g', 'h' and 'i'. In this example the user has only pressed once and so candidates associated to the letter 'g' are displayed adjacent a projected touch point for the key 1504a, see FIG. 15b. The candidates which in this embodiment are 8 are all mapped to each a key of the keypad so that the middle key is mapped to the center candidate—in this example being the letter 'g'. In this example the candidates are "good", "get", "going", "give", "g*", "great", "go" and "got".

As a user presses on a key 1504b marked "3" the candidate being in a position on the display that is mapped to that location is input to the text area 1511.

Figure 15D:
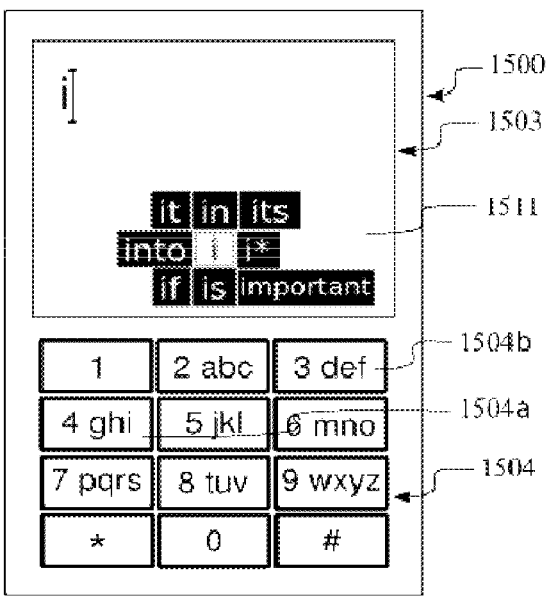

FIG. 15d shows the apparatus after a user has pressed three times on the key marked "4". In this example candidates being associated to the third letter associated with that key are displayed. In this example the candidates are "it", "in", "its", "into", "i*", "if", "is" and "important". These candidates can be selected by pressing on the corresponding key.

It should be understood that the embodiments described with reference to FIG. 15 can be combined with the embodiment described with reference to FIGS. 4, 5, 6, 7, 8 and 9.

In all embodiments described herein a user is able to input a word or wordstem using a single and simple touch gesture. By always displaying the candidates in the same place and order a user will be able to learn which gestures correspond to which wordstem or in other words which sequence of strokes will result in which wordstem. This provides for an input method resembling stenography where a user inputs words or wordstems by a series of simple strokes.

Tests have shown that this is very easy to learn and to understand.

A dictionary of 200 wordstems has proven to be ample to provide a high success rate for finding the wanted candidate within only two strokes in a gesture. In other words to present the wanted candidate within the first set or the further set of candidates.

The method is easy to learn as each part or stroke of a complete gesture is explained and the available options for proceeding are displayed to the user in close proximity to the stylus used.

In the examples above the candidates have been disclosed to be words, wordstems, combination of words, names etc. It should be noted that the teachings herein can be applied to all sorts of characters and character strings.

In one embodiment a candidate may be a punctuation mark or combination thereof. In such an embodiment a user would be able to input emoticons popularly referred to as smileys by pressing on a key associated with punctuation marks such as '.', ',', ';' or ':'. An emoticon is a combination of characters that resemble a drawing of a person expressing a certain mood. For example the combination ":)" is used to illustrate happiness and the combination ":(" is used to illustrate sadness.

In one embodiment a candidate may be a combination of control characters. In one such embodiment a candidate may be a combination of control characters and other characters. In such an embodiment a user would be able to input the character string ", ↲↲". The character '↲' indicates a line feed and a carriage return meaning that an editor receiving it skips to a new line and starts at the beginning of it. In one example this character string is a candidate for a key associated with the character ','. A user wanting to write a letter or other message and having input "Dear John" would then be able to easily add the comma and insert an empty line before starting to write the message body by making a simple gesture starting in a key being associated with ','. If we assume that the user continues inputting "It was nice to see you." the resulting input would look like:

"Dear John,

It was nice to see you."

In one embodiment adapted for input of complex characters such as Katakana or Hiragana or similar characters used in Chinese, Japanese or Korean the keypad is associated with a basic stroke and the candidates are supplemental strokes that can be combined to form a character, either a partial character or a complete character.

In one embodiment a controller is configured to receive and store strings as candidates for a specified character. In such an embodiment a user selects a key and a letter or character being associated with that key and inputs one or more candidates for that letter or character.

In one embodiment a controller is further configured to receive display settings for a candidate, which display settings indicate where or in what order the candidate is to be displayed.

In one embodiment a controller is configured to receive touch input identifying a candidate followed by a drag and drop action rearranging the candidate and storing the new arrangement. In such an embodiment a user is able to rearrange the candidates by dragging and dropping them.

In an example embodiment according to the embodiments above a user is able to select the ',', input a candidate ", ↲↲" and arrange it on the lower-left corner of the key. To input the string a user starts on the ',' and slides left-wise down and releases. This gesture resembles a large comma and so is easy to remember.

In one embodiment a controller is configured to receive instructions by user input to assign a candidate form one letter to another. In one embodiment a user issues these instructions by dragging and dropping one candidate from a set for a letter to another letter.

It should be noted that the candidates stored for a letter does not need to have that letter as an initial character.

FIG. 16 shows an apparatus 1600 according to the teachings herein. It should be noted that such an apparatus is not limited to a mobile phone, but can be any apparatus capable of receiving text input.

The apparatus 1600 has a touch display 1603 on which a virtual keypad 1604 is displayed. The virtual keypad 1604 comprises a virtual key 1604*b* which in this embodiment is associated with a binding function.

A controller is configured to receive input identifying the bind key 1604*b* and to execute the binding function in response thereto.

The binding function's purpose is to bind two word or words stems together.

In one embodiment a controller is configured to parse the input text for a separating space character and removing it. In one embodiment the last input space character is removed. In one embodiment the left-most space character is removed. In one embodiment the right-most space character is removed.

In one embodiment the controller is configured to perform the parsing from left to right.

In one embodiment the controller is configured to perform the parsing from right to left.

In one embodiment the controller is configured to perform the parsing from up to down.

The direction is in one embodiment dependent on an input language used.

The space character to be removed is highly dependant on issues such as language input methodology. For example, for an implementation for English the right-most space character could be removed for and for an implementation for Arabic the left-most character could be removed.

In one embodiment a controller is configured to receive input events and to maintain these events in a memory structure such as a stack. In one such embodiment a controller is configured to traverse the stack and remove an event being associated with a space character. In one embodiment the input events are associated with a character string (possibly being of length 1) not being a space character. In such an embodiment the stack contains words or other text strings which are displayed with interleaving space characters. In such an embodiment a controller is configured to traverse the stack and to combine two events into one.

In one embodiment a controller is configured to parse the text to find the first space character. In one embodiment the direction of parsing depends on the language used.

Figure 16A:
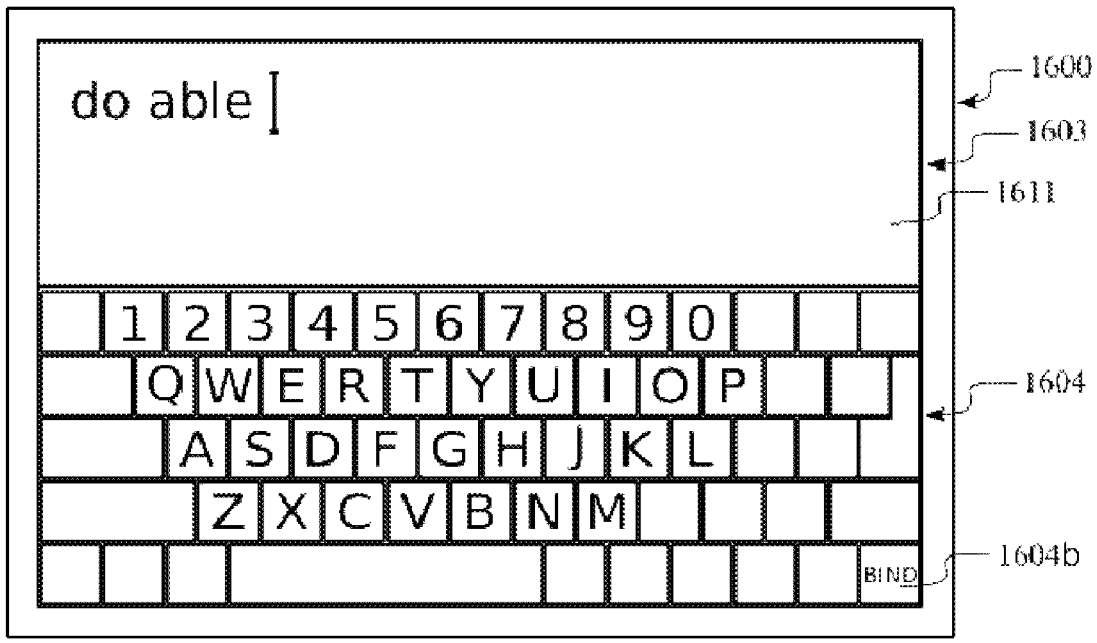
Figure 16B:
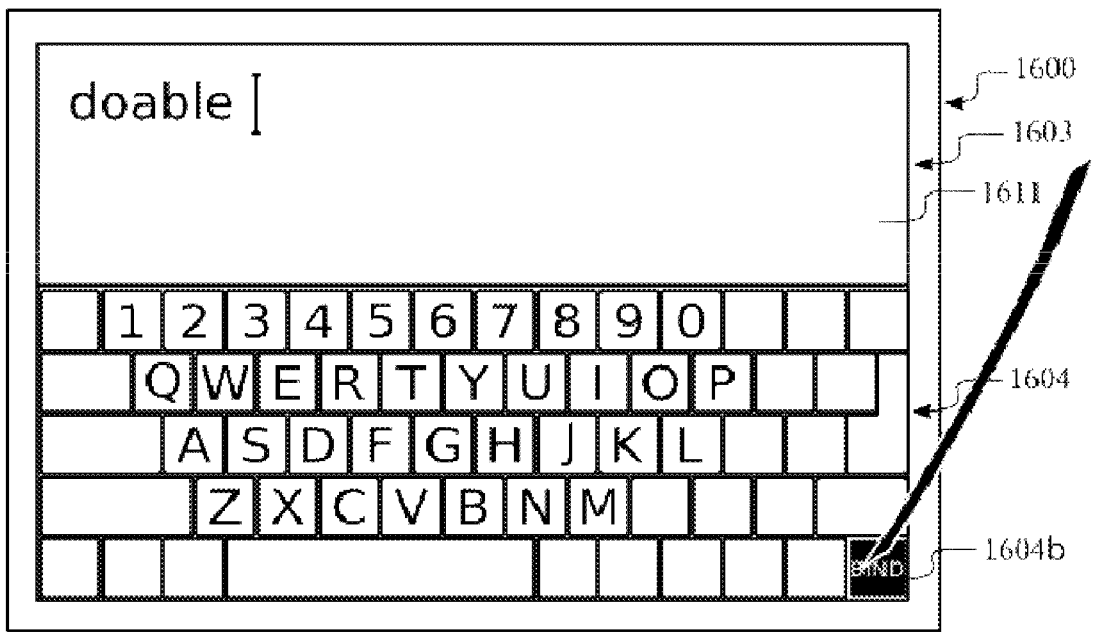

FIG. 16*a* shows an example where the user has input the words "do" and "able" which are separated with a space character. As the user presses on the virtual key 1604*b* the controller is configured to execute the binding function and it removes the space character separating the two words and displays the resulting text string in the display area 1611. The resulting text string is now "doable" as can be seen in FIG. 16*b*.

Figure 16C:
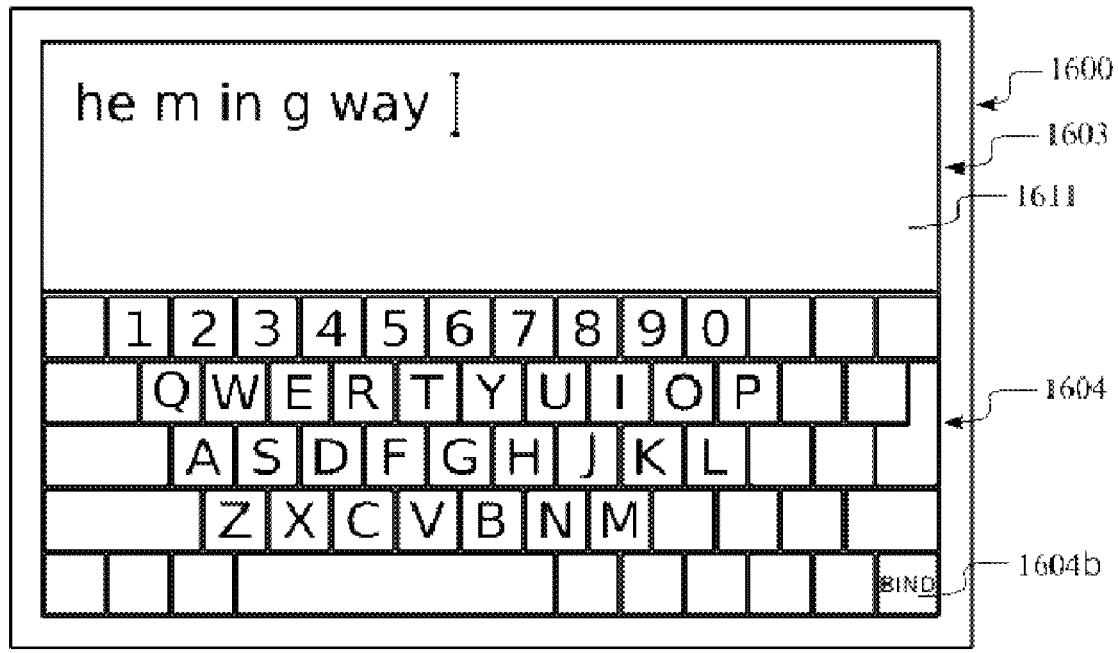

FIG. 16*c* shows an example text string representing a longer word. The string used in this example is "He m in g way". In one embodiment the wordstems have been input using an input method according to the above described embodiments.

Figure 16D:
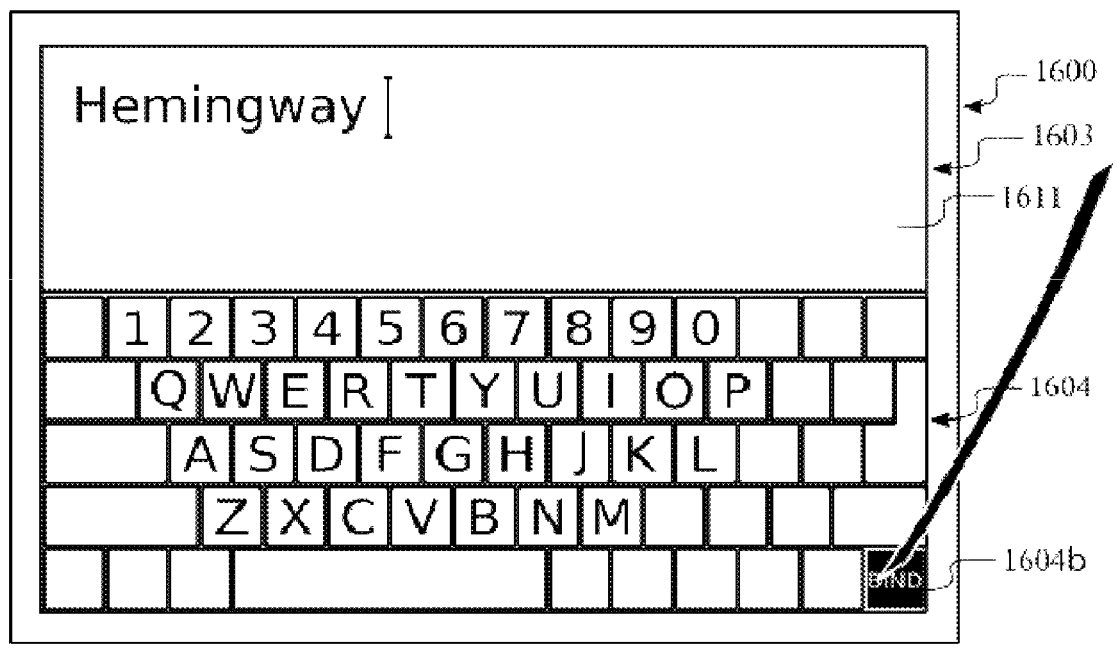

By repeated pressing on the bind key 1604*b* the controller repeatedly executes the binding function. FIG. 16*d* shows the displayed view after a total of four presses on the bind key generating the intermediate resulting text strings: "He m in g way"->"He m in gway"->"He m ingway"->"He mingway"->"Hemingway". FIG. 16*d* shows the result.

In another example for the Swedish language the string is "ut rike s pol i tik". Repeated pressing on the bind key generates the results "Ut rike s pol i tik"->"Ut rike s pol itik"-

>"Ut rike s politik"->"Ut rike spolitik"->"Ut rikespolitik"->"Utrikespolitik" meaning foreign exchange politics.

Swedish along with languages such as Hungarian, Tagalog (Philippines), Turkish and Finnish are agglutinative languages. Words in such languages are constructed by morphemes or word stems that are commonly used in that language. This characteristic of such languages makes them highly suited for input using the teachings herein.

Japanese is another example of agglutinative languages where characteristics and deflections of a word such as negation, past tense, casuality and passive voice are added to the basic form.

It should be noted that also fusional languages, such as German, and isolating languages, such as Vietnamese and classical Chinese, find use of the teachings herein as such languages also comprise construct using commonly used wordstems and because the teachings herein are also directed at inputting complete words either directly or by completion.

In one embodiment the controller is configured to continue parsing for a space character as long as a match for the resulting word is found in a dictionary database.

It is thus possible to bind the wordstems together in steps such as "utrikes politik" saving some keypresses.

It should be noted that even though the examples having been described above with reference to FIGS. 4 to 16 have been given with a QWERTY-style keypad it should be understood that it is also workable with other types of keypads.

Figure 17:
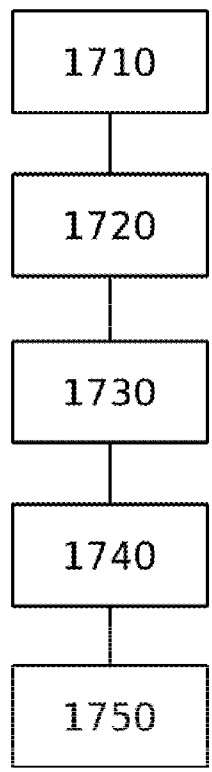
FIG. 17 is a flow chart describing a method according to an embodiment of the application.

FIG. 17 is a flow chart showing a method according to the teachings herein.

In an initial step a controller receives input identifying a letter and a touch point, possibly a projected touch point 1710. In response thereto a set of candidates are generated in step 1720 and displayed around a touch point, possibly a projected touch point in step 1730. The controller receives further input identifying a candidate in step 1740 and inputs the candidate as text input 1750.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, media players, personal organizers, computers or any other apparatus designed for text input.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a user will be able to input words and wordstems using only a few simple and swift gestures. As a user learns the paths for the different candidates the user will be able to use the input method described herein as a digital stenography.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as media players, palmtop computers, laptop computers, desktop computers, game consoles, electronic dictionaries and the like. It should also be noted that there are many alternative ways of implementing the methods and apparatuses of the teachings of the present application.

It should also be noted that the teachings herein can be utilized and practiced on input means commonly known for assisting handicapped persons. Such input means usually comprise a pointing device and a display which will then take the role as the stylus and the display of this application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. An apparatus comprising a controller, arranged to:
receive input identifying a touch point at a first position wherein said input is a touch input identifying a virtual key and wherein said touch point is the point of touch for the touch input;
display a first set of candidates comprising at least one candidate at a second position offset from said touch point,
said first position and said second position both being in a common display area, and
to interpret subsequent touch input originating from the touch point as having an offset position at a projected touch point originating at the second position wherein the offset of the projected touch point and an offset of the subsequent touch input are related, the candidates comprising candidate wordstems wherein at least one of the wordstems comprises a word;
receive input referring to a first candidate being comprised in said first set;
receive a select command of said first candidate; and
input said selected candidate as text.

2. The apparatus according to claim 1, wherein said controller is further configured to display a further set of candidates upon receipt of input referring to said first candidate, wherein said further set of candidates comprises at least one further candidate.

3. The apparatus according to claim 2, wherein said controller is further configured to receive input referring to a further candidate being comprised in said further set of candidates and to identify said further candidate as a first candidate.

4. The apparatus according to claim 1, wherein said controller is further configured to display a second set of candidates upon receipt of input referring to said first candidate, wherein said second set of candidates comprises at least one second candidate being an alternative to the at least one candidate of said first set and said second set of candidates being regarded as a first set of candidates.

5. The apparatus according to claim 2 or 4, wherein said controller is further configured to display a second set comprising a further set of candidates.

6. The apparatus according to claim 1, wherein said controller is further configured to display said touch point on a display.

7. The apparatus according to claim 1, wherein said controller is further configured to display said first set of candidates as virtual keys.

8. The apparatus according to claim 1, wherein said controller is further configured to receive a touch input release and interpret said release as a select command.

9. The apparatus according to claim 1, wherein said controller is configured to provide the first set of candidates based on previous input.

10. The apparatus according to claim 1, wherein said first set of candidates comprises a candidate that is associated with a word completion.

11. The apparatus according to claim 1, wherein said first set of candidates comprises a candidate that is associated with a prediction.

12. The apparatus according to claim 1, wherein the first set of candidates comprises at least one candidate that is static with regards to at least one of placement and associated letter.

13. The apparatus according to claim 1, wherein each candidate of the first set of candidates is associated with a direction and wherein said controller is configured to receive a direction indication and to identify a candidate accordingly as a first candidate.

14. A method for text input comprising:
receiving input identifying a touch point at a first position wherein said input is a touch input identifying a virtual key and wherein said touch point is the point of touch for the touch input;
displaying a first set of candidates comprising a plurality of candidates, the candidates comprising candidate wordstems at a second position offset from said touch point,
said first position and said second position both being in a common display area, and
interpreting subsequent touch input originating from the touch point as having an offset position at a projected touch point originating at the second position wherein the offset of the projected touch point and an offset of the subsequent touch input are related, wherein at least one of the wordstems comprises a word;
receiving input referring to a first candidate being comprised in said first set;
receiving a select command of said first candidate; and
inputting said selected candidate as text.

15. The method according to claim 14, further comprising displaying a further set of candidates upon receipt of input referring to said first candidate, wherein said further set of candidates comprises at least one further candidate.

16. The method according to claim 15 further comprising receiving input referring to a further candidate being comprised in said further set of candidates and identifying said further candidate as a first candidate.

17. The method according to claim 14 further comprising displaying a second set of candidates upon receipt of input referring to said first candidate, wherein said second set of candidates comprises at least one second candidate being an alternative to the at least one candidate of said first set and said second set of candidates being regarded as a first set of candidates.

18. The method according to claim 15 or 17 further comprising displaying a second set comprising a further set of candidates.

19. The method according to claim 14, further comprising displaying said touch point.

20. The method according to claim 14 further comprising displaying said first set of candidates as virtual keys.

21. The method according to claim 14 further comprising receiving a touch input release and interpreting said release as a select command.

22. The method according to claim 14, comprising displaying the first set of candidates based on previous input.

23. The method according to claim 14, wherein the first set of candidates comprises a candidate that is associated with a word completion.

24. The method according to claim 14, wherein the first set of candidates comprises a candidate that is associated with a prediction.

25. The method according to claim 14, wherein the first set of candidates comprises at least one candidate that is static with regards to at least one of placement and associated letter.

26. The method according to claim 14, wherein each candidate of the first set of candidates is associated with a direction and wherein said receiving input comprises receiving an indication of a direction indication and identifying a candidate accordingly as the first candidate.

27. A user interface comprising a controller, wherein said controller is arranged to:
receive input identifying a touch point at a first position wherein said input is a touch input identifying a virtual key and wherein said touch point is the point of touch for the touch input;
display a first set of candidates comprising at least one candidate at a second position offset from said touch point,
said first position and said second position both being in a common display area, and
to interpret subsequent touch input originating from the touch point as having an offset position at a projected touch point originating at the second position wherein the offset of the projected touch point and an offset of the subsequent touch input are related, the candidates comprising candidate wordstems wherein at least one of the wordstems comprises a word;
receive input referring to a first candidate being comprised in said first set;
receive a select command of said first candidate; and
input said selected candidate as text.

28. A non-transitory computer readable medium comprising at least computer program code for controlling an apparatus, said computer readable medium comprising:
software code for receiving input identifying a touch point at a first position wherein said input is a touch input identifying a virtual key and wherein said touch point is the point of touch for the touch input;
software code for displaying a first set of candidates comprising a plurality of candidates, the candidates comprising candidate wordstems at a second position offset from said touch point,
said first position and said second position being in a common display area, and
interpreting subsequent touch input originating from the touch point as having an offset position at a projected touch point originating at the second position wherein the offset of the projected touch point and an offset of the subsequent touch input are related, wherein at least one of the wordstems comprises a word;
software code for receiving input referring to a first candidate being comprised in said first set;
software code for receiving a select command of said first candidate; and
software code for inputting said selected candidate as text.

29. The apparatus of claim 1 in which the first set of candidates comprises at least one wordstem that comprises a suffix, a prefix, a commonly used letter combination, or a partial word.

30. The method of claim 14 in which the first set of candidates comprises at least one wordstem that comprises a suffix, a prefix, a commonly used letter combination, or a partial word.

31. The user interface of claim 27 in which the first set of candidates comprises at least one wordstem that comprises a suffix, a prefix, a commonly used letter combination, or a partial word.

32. The non-transitory computer readable medium of claim 28 in which the first set of candidates comprises at least one wordstem that comprises a suffix, a prefix, a commonly used letter combination, or a partial word.

33. The apparatus according to claim 1, wherein the offset of the projected touch point and the offset of the subsequent touch input are related in that the offsets are equal.

34. The apparatus according to claim 1, wherein the offset of the projected touch point and the offset of the subsequent touch input are related in that a displayed candidate is associated with a virtual key.

35. The method according to claim 14, wherein the offset of the projected touch point and the offset of the subsequent touch input are related in that the offsets are equal.

36. The method according to claim 14, wherein the offset of the projected touch point and the offset of the subsequent touch input are related in that a displayed candidate is associated with a virtual key.

\* \* \* \* \*